(12) United States Patent
Wei et al.

(10) Patent No.: US 10,984,175 B2
(45) Date of Patent: Apr. 20, 2021

(54) SYSTEMS AND METHODS FOR DYNAMICALLY MODIFYING A REQUESTED WEB PAGE FROM A SERVER FOR PRESENTATION AT A CLIENT

(71) Applicant: Yottaa Inc., Boston, MA (US)

(72) Inventors: Coach K. Wei, Natick, MA (US); Robert Buffone, Wakefield, MA (US)

(73) Assignee: Yottaa Inc., Boston, MA (US)

( * ) Notice: Subject to any disclaimer, the term of this patent is extended or adjusted under 35 U.S.C. 154(b) by 0 days.

(21) Appl. No.: 13/963,530

(22) Filed: Aug. 9, 2013

(65) Prior Publication Data
US 2015/0046789 A1 Feb. 12, 2015

(51) Int. Cl.
| | |
|---|---|
| *G06F 3/00* | (2006.01) |
| *G06F 40/14* | (2020.01) |
| *G06F 9/451* | (2018.01) |
| *G06F 16/957* | (2019.01) |

(52) U.S. Cl.
CPC ............ *G06F 40/14* (2020.01); *G06F 9/452* (2018.02); *G06F 16/9577* (2019.01)

(58) Field of Classification Search
CPC ............... H04L 67/28; G06F 17/3089; G06F 17/30864; G06F 17/30902; G06F 40/14; G06F 9/452; G06F 16/9577
USPC .................. 715/234, 243, 254, 255
See application file for complete search history.

(56) References Cited

U.S. PATENT DOCUMENTS

| | | | |
|---|---|---|---|
| 6,618,751 B1 | 9/2003 | Challenger et al. | |
| 7,266,595 B1 | 9/2007 | Black et al. | |
| 7,398,304 B2 | 7/2008 | Smith et al. | |
| 7,523,158 B1* | 4/2009 | Nickerson | G06F 17/3089 709/203 |
| 7,657,595 B2 | 2/2010 | Agarwalla et al. | |
| 7,711,854 B2 | 5/2010 | Ecklund et al. | |
| 7,797,376 B1* | 9/2010 | Desai | 709/203 |
| 8,001,175 B2 | 8/2011 | Betancourt et al. | |

(Continued)

FOREIGN PATENT DOCUMENTS

EP          1 918 826 B1     2/2012

OTHER PUBLICATIONS

Freed "Multipurpose Internet Mail Extensions (MIME) Part One: Format of Internet Message Bodies," <https://tools.ietf.org/html/rfc2045>, pp. 1-32. (Year: 1996).*

(Continued)

*Primary Examiner* — Kyle R Stork
(74) *Attorney, Agent, or Firm* — Foley and Lardner LLP

(57) ABSTRACT

In some aspects, the disclosure is directed to methods and systems for dynamically modifying a web page. An intermediary device may receive a request from a client for a web page of a server. The intermediary may transmit a first fragment of the web page to include in a modified web page for presentation at the client. The first fragment may correspond to a static portion of the web page. The intermediary may transmit a second fragment to the client to include in the modified web page, which may include a dynamic portion of the web page provided by the server in response to the request. The intermediary may incorporate code into at least one of the first and second fragments prior to transmission. The code may, upon execution as the corresponding fragment is presented to a user, dynamically perform an action to improve the user's experience.

30 Claims, 12 Drawing Sheets

(56) References Cited

U.S. PATENT DOCUMENTS

| | | | |
|---|---|---|---|
| 8,694,520 B1* | 4/2014 | Krishnakumar | G06F 17/30867 |
| | | | 707/758 |
| 8,701,000 B2* | 4/2014 | Kroeger | G06F 17/212 |
| | | | 715/273 |
| 9,282,145 B2 | 3/2016 | Wei et al. | |
| 9,870,349 B2 | 1/2018 | Wei et al. | |
| 9,953,007 B2 | 4/2018 | Oyarzabal et al. | |
| 2002/0048269 A1* | 4/2002 | Hong | H04L 61/2015 |
| | | | 370/389 |
| 2002/0129064 A1 | 9/2002 | Guthrie | |
| 2004/0049574 A1 | 3/2004 | Watson et al. | |
| 2004/0064481 A1 | 4/2004 | Azami | |
| 2004/0064497 A1 | 4/2004 | Debey | |
| 2004/0162886 A1 | 8/2004 | Ims et al. | |
| 2005/0152355 A1 | 7/2005 | Henriques | |
| 2005/0210243 A1 | 9/2005 | Archard et al. | |
| 2005/0251856 A1 | 11/2005 | Araujo et al. | |
| 2006/0015512 A1 | 1/2006 | Alon et al. | |
| 2006/0225065 A1 | 10/2006 | Chandhok et al. | |
| 2008/0016240 A1 | 1/2008 | Balandin | |
| 2008/0077809 A1 | 3/2008 | Hayler et al. | |
| 2008/0104269 A1 | 5/2008 | Vitanov et al. | |
| 2008/0126479 A1 | 5/2008 | Zhang et al. | |
| 2009/0281989 A1 | 11/2009 | Shukla et al. | |
| 2010/0063998 A1 | 3/2010 | Nakamura | |
| 2010/0131585 A1 | 5/2010 | Rodrigue et al. | |
| 2011/0126248 A1 | 5/2011 | Fisher et al. | |
| 2012/0030309 A1 | 2/2012 | Onorato et al. | |
| 2012/0066586 A1 | 3/2012 | Shemesh | |
| 2012/0137210 A1 | 5/2012 | Dillon | |
| 2012/0203873 A1 | 8/2012 | Lewin et al. | |
| 2012/0209725 A1* | 8/2012 | Bellinger | G06Q 30/0225 |
| | | | 705/14.73 |
| 2012/0303697 A1* | 11/2012 | Alstad | 709/203 |
| 2013/0007107 A1* | 1/2013 | Behl et al. | 709/203 |
| 2013/0039419 A1 | 2/2013 | Denoual et al. | |
| 2013/0061160 A1* | 3/2013 | Tseng | G06F 17/30884 |
| | | | 715/760 |
| 2013/0091417 A1* | 4/2013 | Cordasco | 715/234 |
| 2013/0097484 A1* | 4/2013 | Nakamura | 715/234 |
| 2013/0097522 A1* | 4/2013 | Devries | 715/745 |
| 2013/0111325 A1 | 5/2013 | Yue et al. | |
| 2013/0124621 A1* | 5/2013 | Lepeska | G06F 16/9574 |
| | | | 709/203 |
| 2013/0124683 A1 | 5/2013 | Watanabe et al. | |
| 2013/0166634 A1* | 6/2013 | Holland | 709/203 |
| 2013/0227004 A1* | 8/2013 | Scoda | 709/203 |
| 2013/0227394 A1* | 8/2013 | Sazhin et al. | 715/234 |
| 2013/0276024 A1* | 10/2013 | Grant et al. | 725/34 |
| 2014/0207911 A1* | 7/2014 | Kosmach et al. | 709/218 |
| 2014/0215605 A1* | 7/2014 | Decime et al. | 726/22 |
| 2014/0245124 A1* | 8/2014 | Gonzalez | 715/234 |
| 2014/0365861 A1* | 12/2014 | Lasmarias | G06F 9/54 |
| | | | 715/234 |
| 2015/0046789 A1 | 2/2015 | Wei et al. | |
| 2016/0191658 A1* | 6/2016 | Kolam | G06F 17/30893 |
| | | | 709/217 |

OTHER PUBLICATIONS

Freed "Multipurpose Internet Mail Extensions (MIME) Part Two: Media Types" <https://tools.ietf.org/html/rfc2046>, pp. 1-45. (Year: 1996).*
International Search Report & Written Opinion on PCT/US2014/048868 dated Nov. 25, 2014.
Final Office Action on U.S. Appl. No. 15/061,711 dated May 18, 2018.
Final Office Action on U.S. Appl. No. 15/802,025 dated Mar. 21, 2019.
Final Office Action on U.S. Appl. No. 15/808,671 dated Jun. 13, 2019.
International Preliminary Report on Patentability on PCT/US2014/012962 dated Mar. 31, 2016.
International Search Report & Written Opinion on PCT/US2014/012962 dated Jun. 27, 2014.
Non-Final Office Action on U.S. Appl. No. 15/802,025 dated Jun. 15, 2018.
Non-Final Office Action on U.S. Appl. No. 15/808,671 dated Oct. 15, 2018.
Notice of Allowance on U.S. Appl. No. 14/163,642 dated Oct. 22, 2015.
Notice of Allowance on U.S. Appl. No. 15/061,711 dated Jun. 13, 2019.
Office Action on U.S. Appl. No. 14/163,627 dated Apr. 8, 2016.
Office Action on U.S. Appl. No. 14/163,627 dated Jan. 29, 2015.
Office Action on U.S. Appl. No. 14/163,627 dated Oct. 4, 2016.
Office Action on U.S. Appl. No. 14/163,627 dated Oct. 8, 2015.
Office Action on U.S. Appl. No. 14/163,627 dated Mar. 23, 2017.
Office Action on U.S. Appl. No. 14/163,627 dated Jun. 18, 2015.
Office Action on U.S. Appl. No. 14/163,627 dated Jul. 3, 2014.
Office Action on U.S. Appl. No. 14/163,642 dated Feb. 13, 2015.
Office Action on U.S. Appl. No. 14/163,642 dated Aug. 11, 2014.
Office Action on U.S. Appl. No. 15/061,711 dated May 18, 2018.
US Notice of Allowance on U.S. Appl. No. 14/163,627 dated Sep. 8, 2017.
US Notice of Allowance on U.S. Appl. No. 14/163,627 dated Sep. 27, 2017.
US Office Action on U.S. Appl. No. 15/061,711 dated Aug. 28, 2017.

* cited by examiner

SYSTEMS AND METHODS FOR DYNAMICALLY MODIFYING A REQUESTED WEB PAGE FROM A SERVER FOR PRESENTATION AT A CLIENT

FIELD OF THE DISCLOSURE

This disclosure generally relates to systems and methods for web performance optimization and dynamic content delivery. In particular, this disclosure relates to systems and methods for dynamically modifying a requested web page from a server for presentation at a client.

BACKGROUND OF THE DISCLOSURE

Content delivery systems are typically used to improve the end-to-end performance of web content delivery between a server and a client. These systems may cache static web pages or other objects, and may serve these cached objects to requesting clients directly, thereby improving performance while reducing load and congestion on a content originator such as a server. However, a significant portion of typical web content may be dynamic in nature. Thus, web pages that are returned to different clients at different times may differ significantly. For example, web pages catering to personalized web applications are commonly dynamic. As such, typical content delivery systems may not handle dynamic content efficiently. For a web application involving significant dynamic content, when a web client ("browser") requests a webpage, the webpage is served by a web server. The web server may perform certain business logic and database query processing in order to generate the webpage from both dynamic and static content. This server-side processing can take seconds or even longer, while the web client may be waiting for the server to respond. This can significantly impair the web experience of a user.

BRIEF SUMMARY OF THE DISCLOSURE

Described herein are systems and methods for dynamically modifying a requested web page from a server at an intermediary for presentation at a client. The present systems and methods can provide real time intervention via a cloud service or at an intermediary, upon receiving a client's request for a web page of a server. The intermediary may manage content and/or resources delivered to the client while communicating with the server to process or fulfill the request. The intermediary may provide a plurality of HTML fragments that can be assembled into a modified web page for the client, in response to the request. The fragments may be delivered sequentially and in a controlled manner (e.g., as data is available at the intermediary and/or from the server), for processing by the client's browser and presented to the user. This can lead to improved or enhanced system performance (e.g., using caching methods) and/or user experience.

The intermediary may be configured to inject or incorporate code into a transmitted fragment. The code may be executed by the browser (e.g., in the background) as the fragments are loaded or rendered as part of the modified web page. In some embodiments, the code may be intelligently configured to perform certain actions that modify the web page or affect some aspect of a resource of the web page. The web page may be modified to improve user experience. For example, the code may, upon execution, pre-fetch a resource for faster loading at a right moment, provide cookie management for enhanced web-based interactions, incorporate third-party resources to a web page, or alter the characteristics of resources. A requested web page may therefore be modified dynamically at the intermediary and assembled at the client without affecting how the server generates its web pages. Code injected into the fragments can execute in the background as each fragment is loaded onto a browser, altering web page features without the user even realizing except for an improved user experience, e.g., a richer experience with additional or custom content, an improved or more appropriate web page layout, or a more responsive loading or rendering of web page elements.

In some aspects, this disclosure is directed to a method for dynamically modifying a requested web page from a server for presentation at a client. The method may include receiving, by an intermediary between a client and a server, a request from the client for a web page of the server. The intermediary may transmit, responsive to the request, a first fragment of the web page to include in a modified web page for presentation at the client. The first fragment may be based on cached data corresponding to a static portion of the web page. The intermediary may transmit a second fragment of the web page to the client to include in the modified web page. The second fragment may include a dynamic portion of the web page provided by the server in response to the request. The intermediary may incorporate code into at least one of the first fragment and the second fragment prior to transmission. The code may, upon execution as the corresponding fragment in the modified web page is presented to a user of the client, dynamically perform a predefined action to improve the user's experience over that from the requested web page.

In some embodiments, the intermediary incorporates code that directs the client's browser to request for web page data corresponding to the client's device or browser type. The intermediary may incorporate code that directs the client's browser to request for another web page corresponding to the client's device or browser type. The intermediary may incorporate code that adds or modifies a configuration for including advertising in the modified web page. The intermediary may incorporate code that directs the client's browser to pre-fetch a resource to store in a local cache. The intermediary may incorporate code that incorporates a third-party widget or content into the modified web page. The intermediary may incorporate code that controls a location of a resource in the modified web page. The intermediary may incorporate code that controls a time instant for loading a resource to the modified web page.

In some embodiments, the intermediary incorporates code that determines a loading sequence for a plurality of resources. The intermediary may incorporate code that controls a time instant for making a resource visible to the user. The intermediary may incorporate code that triggers loading or visibility of a resource based on a web page loading event. The intermediary may incorporate code that triggers loading or visibility of a resource based on an action by the user. The intermediary may incorporate code that affects an aspect of a resource for the modified web page. The resource may include one or more of: hypertext markup language (HTML) content, an image, a cascading style sheet (CSS), a widget, a social media plug-in, an analytics agent, a pixel tag, a beacon, a trust seal or badge, and an advertisement.

In some embodiments, the intermediary may transmit the request for the web page to the server. The intermediary may receive the requested web page from the server responsive to the request, the web page comprising at least the dynamic portion. The intermediary may receive a cookie from the server responsive to the request. The intermediary may send to the client a cookie from the server. The intermediary may incorporate code in the second fragment to set the cookie at the client for use in a further communication with the server. The intermediary may incorporate code in a third fragment to set the cookie at the client for use in a further communication with the server. The intermediary may incorporate code in a multipurpose internet mail extensions (MIME) multipart message to set the cookie at the client for use in a further communication with the server. The intermediary may transmit the first fragment and the second fragment via MIME multipart messages to include in the modified web page. The intermediary may incorporate code based on a configuration of the intermediary. The intermediary may incorporate code customizable via a user interface.

In certain aspects, the disclosure describes a system for dynamically modifying a requested web page from a server for presentation at a client. The system may include an intermediary between a client and a server. The intermediary may receive a request from the client for a web page of the server. The intermediary may transmit, responsive to the request, a first fragment of the web page to include in a modified web page for presentation at the client. The first fragment may be based on cached data corresponding to a static portion of the web page. The intermediary may transmit a second fragment of the web page to the client to include in the modified web page. The second fragment may include a dynamic portion of the web page provided by the server in response to the request. The system may include code incorporated by the intermediary into at least one of the first fragment and the second fragment prior to transmission. The code, upon execution on the client as the corresponding fragment in the modified web page is presented to a user of the client, may dynamically perform a predefined action to improve the user's experience over that from the requested web page.

In some embodiments, the code directs the client's browser to request for web page data corresponding to the client's device or browser type. The code may direct the client's browser to request for another web page corresponding to the client's device or browser type. The code may add or modify a configuration for including advertising in the modified web page. The code may direct the client's browser to pre-fetch a resource to store in a local cache. The code may incorporate a third-party widget or content into the modified web page. The code may control a location of a resource in the modified web page. The code may control a time instant for loading a resource to the modified web page. The code may determine a loading sequence for a plurality of resources. The code may control a time instant for making a resource visible to the user. The code may trigger loading or visibility of a resource based on a web page loading event. The code may trigger loading or visibility of a resource based on an action by the user. The code may affect an aspect of a resource for the modified web page. The resource may include one or more of: hypertext markup language (HTML) content, an image, a cascading style sheet (CSS), a widget, a social media plug-in, an analytics agent, a pixel tag, a beacon, a trust seal or badge, and an advertisement.

In certain embodiments, the intermediary transmits the request for the web page to the server. The intermediary may receive the requested web page from the server responsive to the request, the web page comprising at least the dynamic portion. The intermediary may receive a cookie from the server responsive to the request. The intermediary may send a cookie from the server to the client. The intermediary may incorporate the code in the second fragment to set the cookie at the client for use in a further communication with the server. The intermediary may incorporate the code in a third fragment to set the cookie at the client for use in a further communication with the server. The intermediary may incorporate the code in a multipurpose internet mail extensions (MIME) multipart message to set the cookie at the client for use in a further communication with the server. The intermediary may transmit the first fragment and the second fragment via MIME multipart messages to include in the modified web page. The intermediary may include a configuration for configuring the code. The intermediary may include a user interface for customizing or configuring the code.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
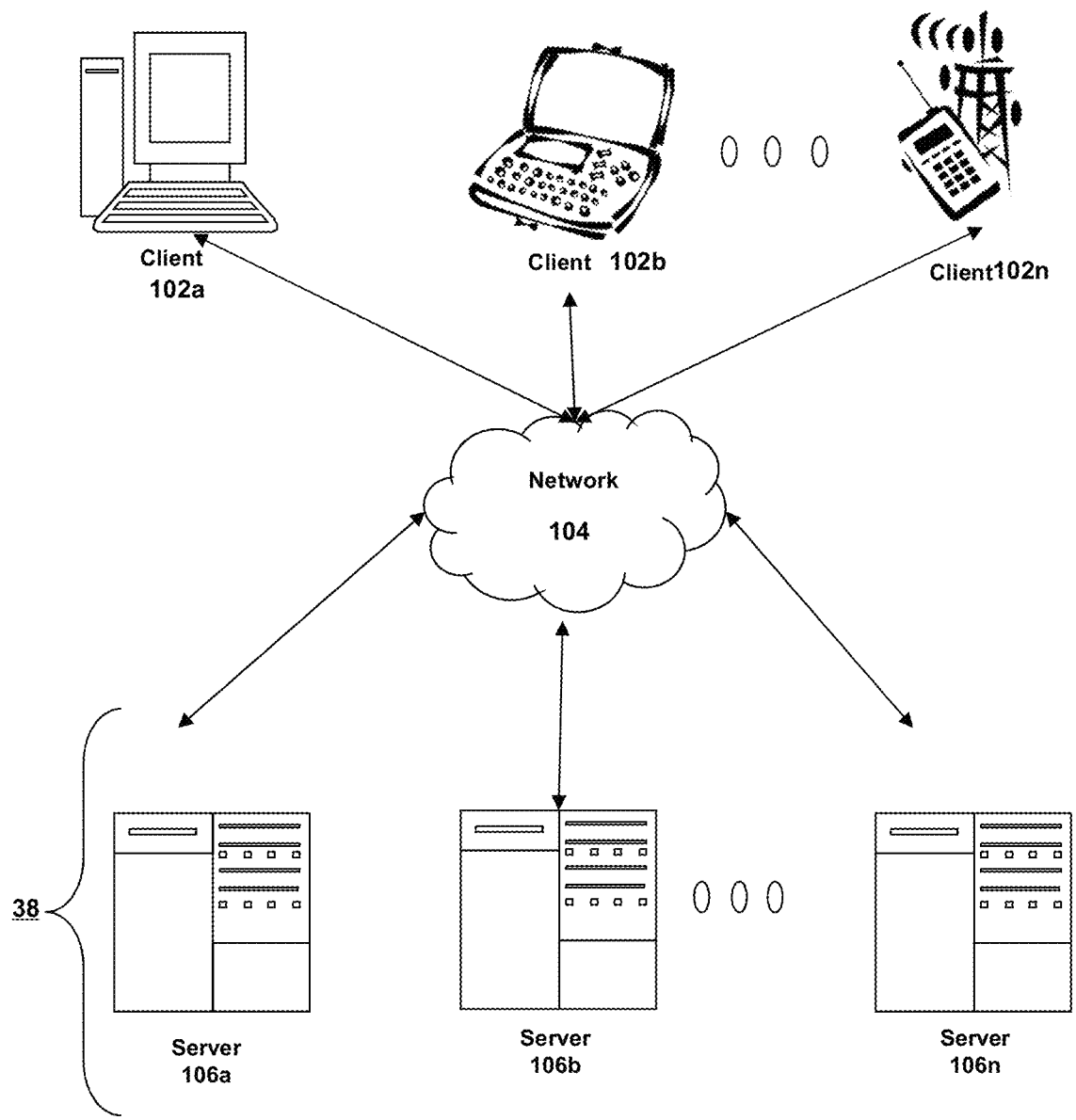
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments systems and methods for dynamically modifying a requested web page from a server for presentation at a client.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 206b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
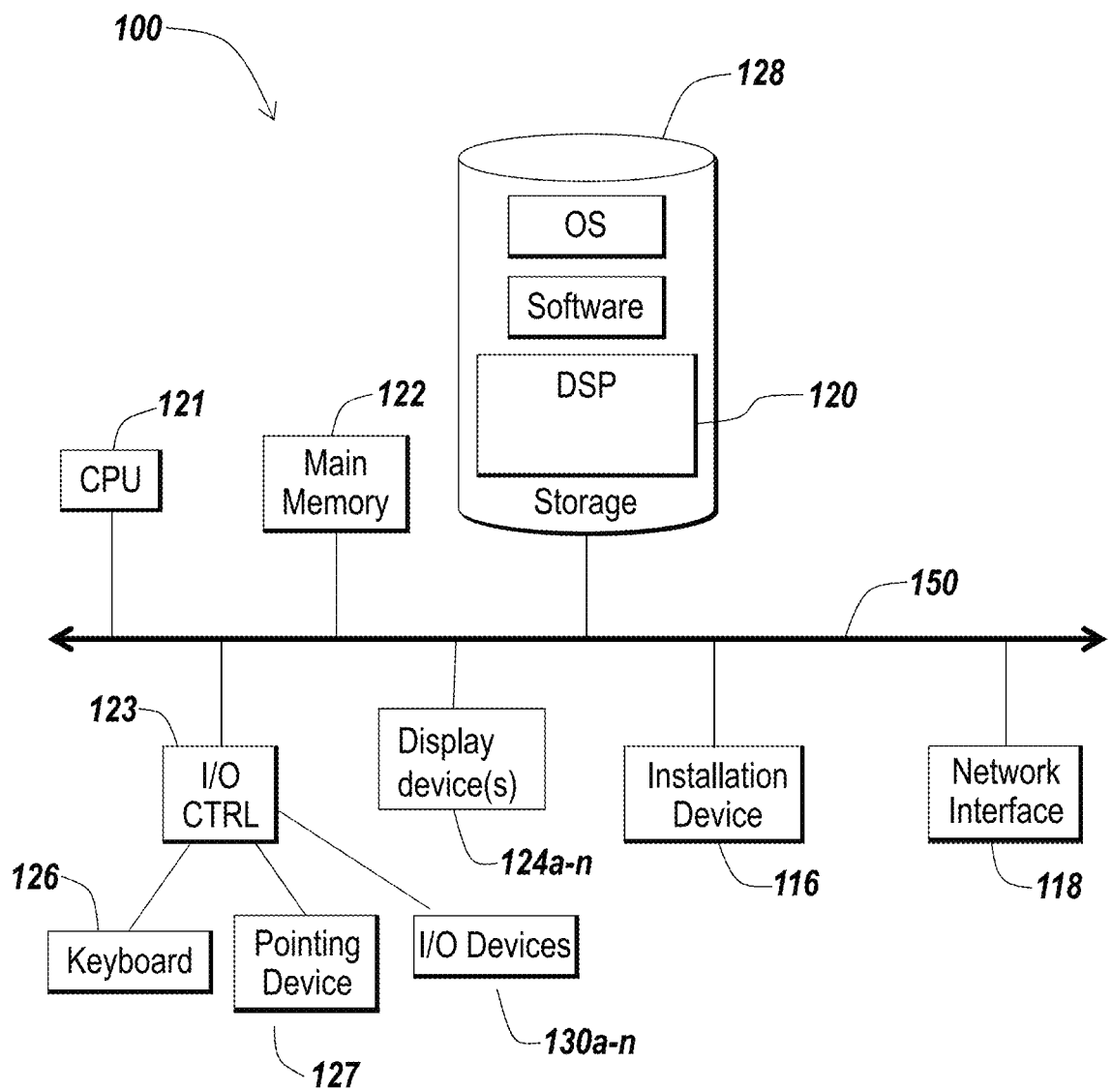
FIGS. 1B and 1C are block diagrams depicting embodiments of computing devices useful in connection with the methods and systems described herein.
Figure 1C:
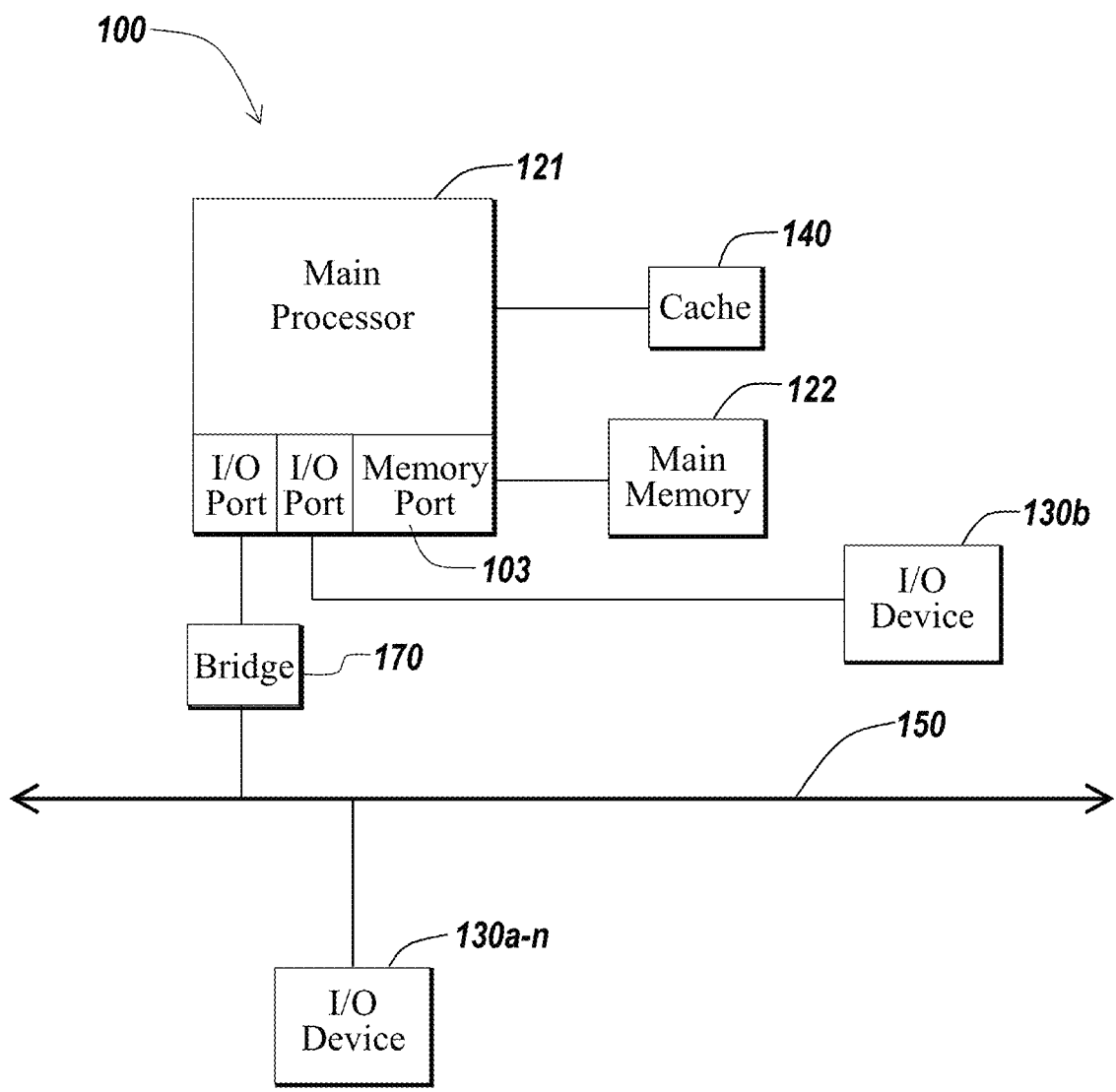

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the demand side platform. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 players. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Dynamically Modifying a Requested Web Page from a Server

Described herein are systems and methods for dynamically modifying a requested web page from a server at an intermediary for presentation at a client. The present systems and methods can provide real time intervention via a cloud service or at an intermediary, upon receiving a client's request for a web page of a server. The intermediary may manage content and/or resources delivered to the client while communicating with the server to process or fulfill the request. The intermediary may provide a plurality of HTML fragments that can be assembled into a modified web page for the client, in response to the request. The fragments may be delivered sequentially and in a controlled manner (e.g., as data is available at the intermediary and/or from the server), for processing by the client's browser and presented to the user. This can lead to improved or enhanced system performance (e.g., using caching methods) and/or user experience.

The intermediary may be configured to inject or incorporate code into a fragment for transmission to the client. The code may be executed by the browser (e.g., in the background) as the fragments are loaded or rendered as part of the modified web page. In some embodiments, the code may be intelligently configured to perform certain actions that modify the web page or affect some aspect of a resource of the web page. The web page may be modified to improve user experience. For example, the code may, upon execution, pre-fetch a resource for faster loading at a right moment, provide cookie management for enhanced web-based interactions, incorporate third-party resources to a web page, or alter certain characteristics of resources. A requested web page may therefore be modified dynamically at the intermediary and assembled at the client without affecting how the server generates its web pages. Code injected into the fragments can execute in the background as each fragment is loaded onto a browser, altering web page features without the user even realizing. The code-based processing produces an improved user experience, e.g., a richer experience with additional or custom content, an improved or more appropriate web page layout, or a more responsive loading or rendering of web page elements.

Figure 2A:
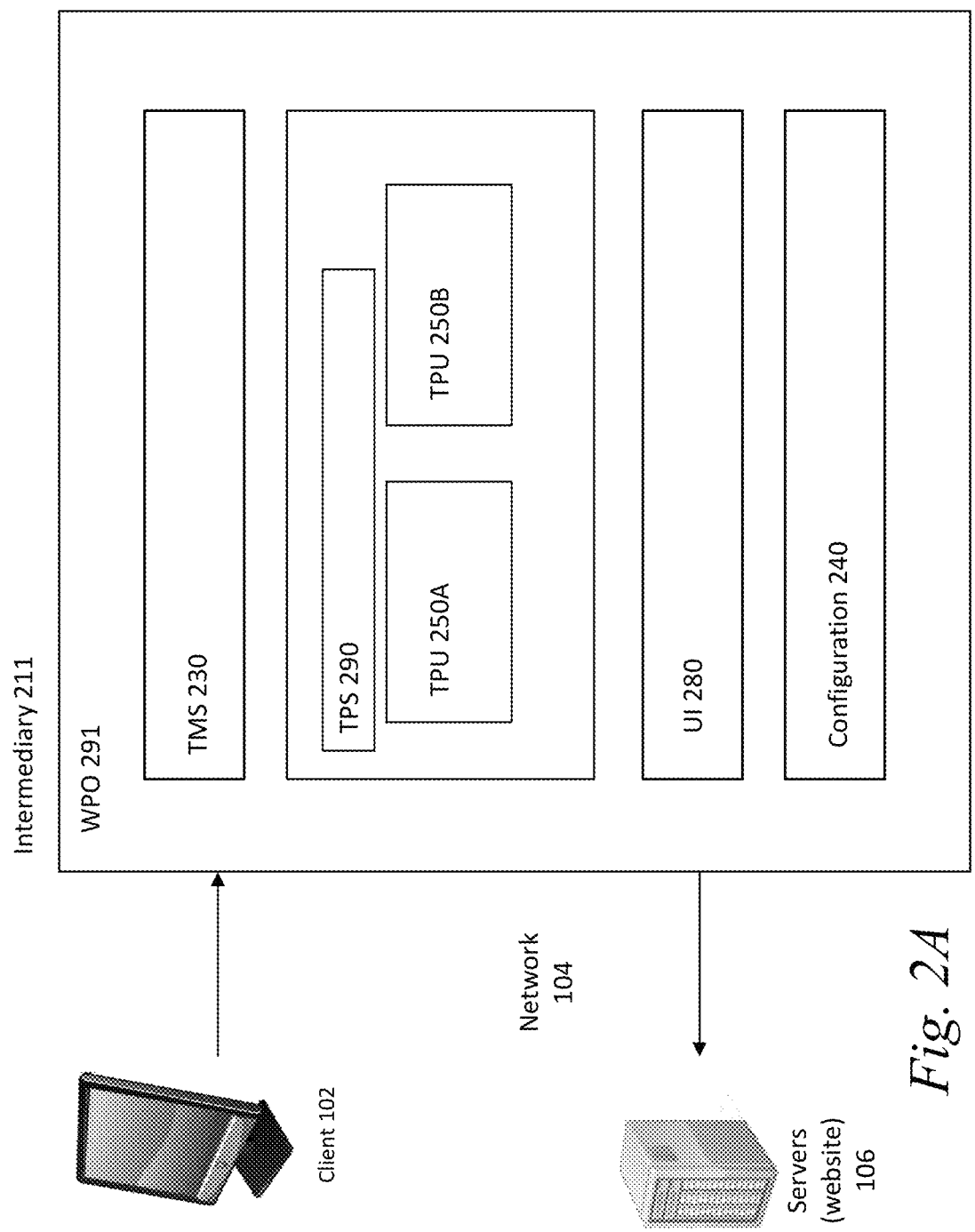
FIG. 2A is a block diagram depicting one embodiment of a system for dynamically modifying a requested web page from a server for presentation at a client.

Referring to FIG. 2A, one embodiment of a system for dynamically modifying a requested web page from a server for presentation at a client is depicted. In brief overview, the system may include an intermediary between at least one client device and at least one server. The intermediary may include a web performance optimization system (WPO) 291. The WPO may include a traffic processing system (TPS) 290, a traffic management system (TMS) 230 and a customizing user interface (UI) 280. The TPS 290 may include geographically-dispersed or cloud-based traffic processing units (TPU) 250. The TPS 290 may receive and process HTTP (or HTTPS) requests and responses between a client and a server or website, and the TMS may manage routing of client requests through the TPS. In the present disclosure, although HTTP may sometimes be referenced by way of example, HTTPS or an alternative scheme is contemplated and within the scope of this disclosure. A user or third party may use the customizing user interface and/or an application programming interface (API) to query, add, remove and adjust a setting, status or configuration of the WPO system to achieve desired results. When a client issues a HTTP request to a server or website, the HTTP request may be directed to pass through the intermediary. Upon receiving HTTP request (e.g., via the TMS), the TPS may analyze the HTTP request (e.g., determine the client type), select and apply context-specific optimization techniques to deliver appropriate fragments for assembly into a modified web page.

The intermediary may include a hardware device such as an appliance, network component, proxy, router, or any combination thereof. In instances where an intermediary device is referenced, the intermediary device may comprise any one or more of the above-mentioned components (e.g., TPS, TMS) within a single device or a collection of networked devices. Each of the components may embody hardware, or a combination of hardware and software (e.g., program code executing on hardware of the intermediary).

The WPO can deliver dynamic content from an originating server to one or more clients via partial object caching and client-side processing. An object may, for example, include a web page, and a partial object may include a fragment of a web page. Instead of connecting to the server directly, a client may communicate with the server via an intermediary device. The intermediary may store cached copies of content and other resources from the server. The cached copies may have been identified and extracted based on prior interactions with the server and/or client. When a client requests for an object such as a web page, the intermediary may return a partial object from its cache almost immediately, e.g., while the intermediary is requesting the object from the server.

The intermediary may employ client-side pre-fetch which allows the WPO to send a fragment or segment of an HTML page (e.g., the "head") as quickly as possible in response to a request. This can accelerate the loading process by allowing a corresponding browser to start the downloading and rendering process in parallel to the server-side processing of the web page request. Once the object from the server is returned responsive to the request, the intermediary may compare the returned object to the delivered partial object from its cache. The intermediary may find any differences based on the comparison, and may deliver the differences to the client. In conjunction with or in between delivery of the partial object and differences, the intermediary may provide the client with client-side processing instructions or injected code. The client (e.g., a browser of the client) may execute the code or instructions while loading or rendering fragments of the web page.

Figure 2B:
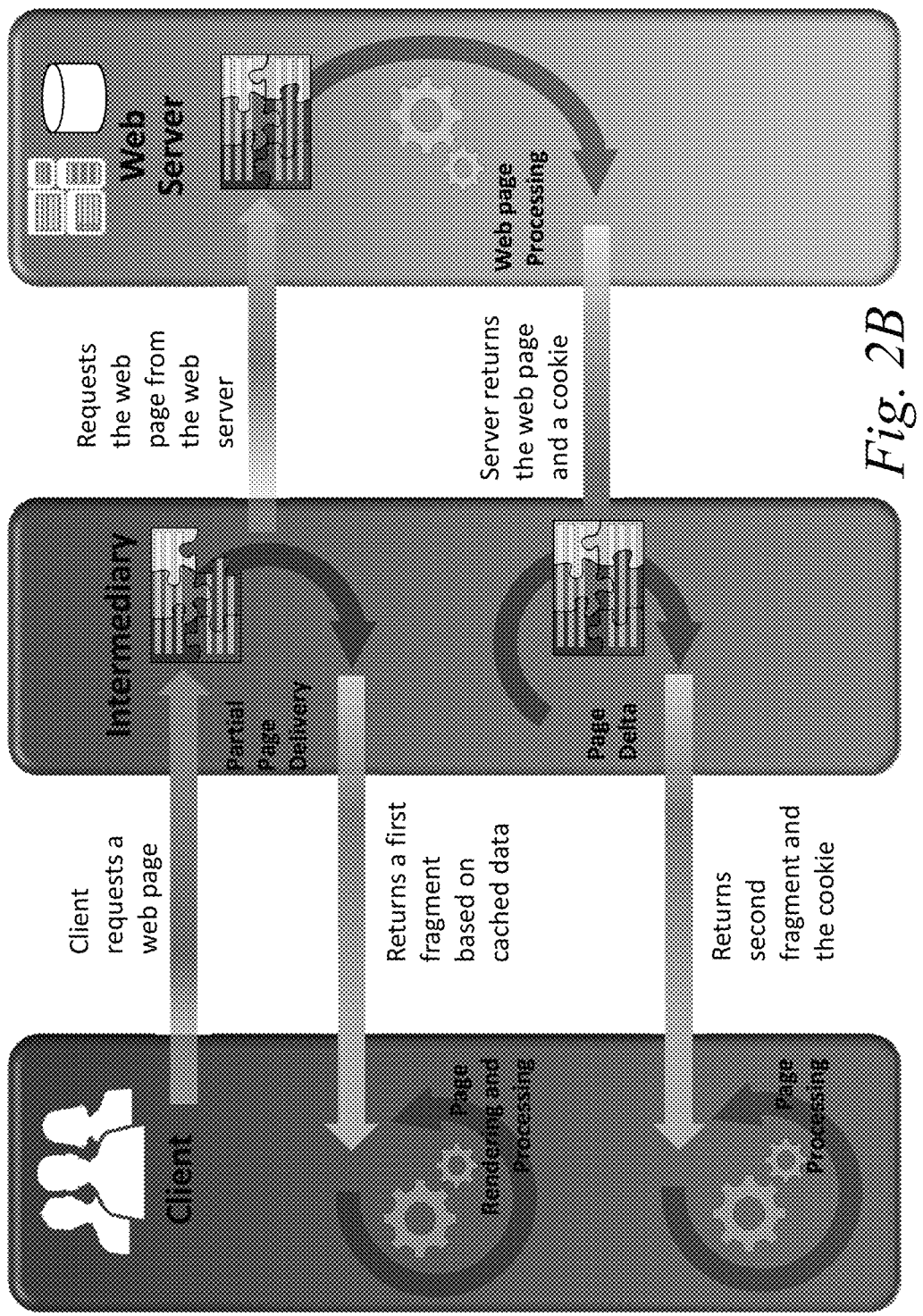
FIGS. 2B and 2C are flow diagrams depicting embodiments of process steps in a method for dynamically modifying a requested web page from a server for presentation at a client.
Figure 2C:
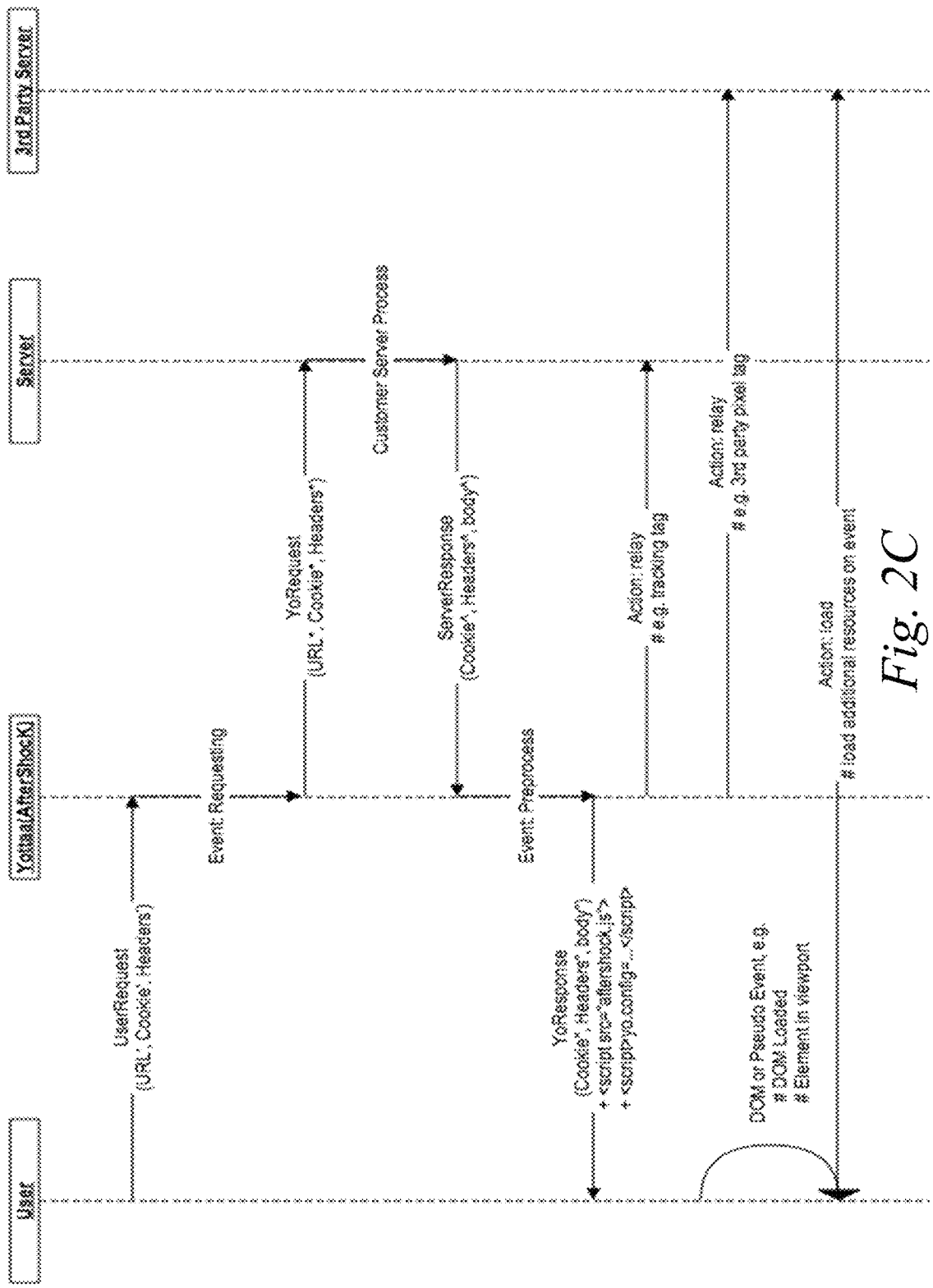

By way of example, embodiments of a method for dynamically modifying a web page are depicted in FIGS. 2B and 2C. Referring to these figures, a prior request for a web page from a server may involve the following illustrative HTML source file:

Original Source File

```
<html>
    <head>
        <link href="//www.foo.com/style.css" rel="stylesheet"
        type="text/css"></link>
        <script src="//www.foo.com/jquery.js"></script>
        <script src="//www.foo.com/app.js"></script>
    </head>
    <body>
        <!--ADDITIONAL/OPTIONAL MATERIAL -->
    </body>
</html>
```

Some portions of the web page may be cached by the intermediary. Once the page is in cache, and in response to a subsequent request for the web page, the WPO system may respond immediately with a HTML fragment, for example up to the "<body>" tag from the cached copy (e.g., as shown in FIG. 2B):

Initial Part/Fragment Returned To The Client

```
<html>
    <head>
        <link href="//www.foo.com/style.css" rel="stylesheet"
        type="text/css"></link>
        <script src="//www.foo.com/jquery.js"></script>
        <script src="//www.foo.com/app.js"></script>
    </head>
```

The TPU may inject or incorporate code into the initial fragment delivered to the client. In the embodiment depicted in FIG. 2C, an initial first fragment is not shown. In parallel, the Traffic Processing Unit (TPU) of the WPO system may convey the request for the webpage to the server. When the TPU receives a response back from the server, the TPU may extract a difference or delta from the web page, relative to the static portion in the initial fragment, to form a second fragment. The difference or delta may include one or more dynamic portions of the requested web page. The TPU may add code, e.g., which may include a "<script>" block that can set any cookie that the server responded with using a Set-Cookie header, to the response or second fragment (e.g., YoResponse, as depicted in FIG. 2C):

Code injected into Subsequent Returned Part/Fragment To The Client

```
<script>
    //This code can be executed on a browser.
    function setCookie(name, value, expires, path){
        var exdate=new Date( );
        exdate.setDate(exdate.getDate( ) + exdays);
        var c_value=escape(value) + ((exdays==null) ? "" : ";
        expires="+exdate.toUTCString( ));
```

-continued

Code injected into Subsequent Returned Part/Fragment To The Client

```
        document.cookie=c_name + "=" + c_value;
    }
    //Set each cookie the server responds with.
    setCookie("session", "12312312312123", new Date(2013, 12, 31),
    "");
</script>
```

If the code is added directly to the response received from the server, the TPU may, in this case, remove content that has already been sent to the client (e.g., the initially returned part/fragment). The TPU may send the remainder of the content (and the injected code) to the client, for example:

The Remaining Response

```
<body>
    <!-- ADDITIONAL/OPTIONAL MATERIAL, e.g., dynamic
portions of the web page, injected code -->
</body>
</html>
```

Web pages may be made up of many different web resources that vary in their content-type and purpose. Each web resource may be stored and requested individually on a web server. This web page structure can make deployment of web pages and websites easy. However, the issue with this deployment model is that the web browser may need to request each of the web resources individually. The web browser may request one web resource and then process it to see if other web resources are needed. If more resources are required, the browser may request them one at a time and then it will repeat the process. Today's websites typically require many web resources to create the interactivity and presentation envisioned by their designers. Ajax, Web 2.0, and Collaboration websites all lead to an increase in the interactivity and design required to acquire and keep customers. Developers may design and implement web pages by breaking up the page into images, JavaScript, CSS, HTML, media (Flash, Sound, Video) and other resources. Developers do this in a way that makes it quick to build, debug, deploy, test, and maintain. This web page development process usually results in resources being broken down into specific tasks including, JavaScript files that implements a specific set of tasks, CSS files that manage the presentation of a certain section, component or element of a page, and images that display one graphical element of a page. However, browsers may be able to open only a limited number of connections to the web server. For instance, if the browser can only create two connections with a web server, resource requests may queue up until a previous resource is completely downloaded.

Typically, the loading of the assets/resources may not happen until the end, after the last byte of a web page. This can waste significant amounts of waiting time, impairing user experience. The WPO can deliver the initial fragment with injected code so that the browser can start to immediately begin the parallelization process of downloading the required assets. For example, the WPO may add JavaScript to the end of the first delivered fragment or HTML section (e.g., into a head section) to load resources or images, instead of waiting for the HTML that include the images. Even certain resources referenced in the page body may be moved into the <head> tag. For a certain web page, the "head" or static portion(s) may be identified by a user via the UI of the intermediary. The WPO may re-order code/scripts that are loaded at the end of the web page file to the beginning. If the browser can begin loading assets, for example, within 100 ms or less from the request, there can be significant page speed increases.

The WPO may incorporate code into a web page fragment that can intelligently modify an aspect of the originally-requested web page. For example, upon execution, the code may direct specific images (e.g., of a social plugin) from a website to load if and/or when these images are viewable to visitor. For example, images that are hidden in a background, cached, or configured to be invisible, may be identified and excluded/delayed by the code from loading and slowing down the page load. Based on specific requirements, a user may configure the code to manage images relative to a viewport. A viewport in a browser tab is the viewable area of a page. For example, a user may configure the code such that when a page on a website is loaded in a visitor's browser tab, all images within viewport may be loaded immediately. A user may configure the code to manage images such that only those images viewable to a visitor when the visitor scrolls on the page, may be loaded when in viewport.

In some embodiments, the WPO may incorporate code to load all or certain social plug-in scripts on a web page when the corresponding document object model (DOM) structure (e.g., HTML source) is ready. The WPO may recognize social plug-ins by their signature string. For example, a Facebook script tag may have a source attribute value: "//connect.facebook.net/en_US/all.js#xfbml=1". In some embodiments, the WPO may incorporate code to load images in a web page slideshow when a visitor performs an action, e.g., clicks a *next* button. The WPO may identify such elements in a web page, for example, an image is a slideshow may have a CSS class "slide-img" and the next button may have a CSS class "slide-btn-next".

In another illustrative example, a web page may place a quoted tweet in the top half of a web page, but locate a related Tweeter script tag at the bottom of the page. The WPO may incorporate code to advance or execute the script tag so that the tweet may be fully functional when loaded. The WPO may incorporate code to configure a social plugin script tag to load when the corresponding social plugin is viewable.

In certain embodiments, the code may operate under a language framework or specification, which may be referred to as "AfterShocK" or "ASK". The specification may provide for a number of system components. For example, AfterShocK may provide for components including a server-side program/script (hereafter sometimes referred to as "Transformer"), and a client-side script/program (hereafter sometimes referred to as "Executor"). The specification may include a language (hereafter sometimes referred to as "ASK lang"). ASK lang may be a domain-specific language designed to configure an AfterShocK system. ASK lang may provide an interface for the Transformer and the Executor. ASK language statements may comprise a structural form of English or other language words, and in some embodiments, may be read naturally. The ASK lang can help bridge participants involved in an AfterShocK system, making communication more efficient. ASK does not necessarily represent any form of internal data structure in either the Transformer or the Executor, nor intermediate data passing in between components. In one illustrative embodiment, the ASK specification includes one or more of the following:

```
DEFINE_STATEMENT ::= define IDENTIFIER VALUE
    RULE_STATEMENT ::= for SELECTOR_STRING
    ACTION_STATEMENTS
    ACTION_STATEMENTS ::= ACTION_STATEMENT |
    ACTION_STATEMENTS
    ACTION_STATEMENT ::= do ACTIONS_STRING
    EVENT_STATEMENT
    ACTIONS_STRING ::= ACTION_STRING
    ACTIONS_STRING_REST
    ACTIONS_STRING_REST ::= "" | "," ACTION_STRING
    ACTIONS_STRING_REST
    ACTION_STRING ::= FUNCTION_CALL_STYLE
    EVENT_STATEMENT ::= on EVENTS_STRING
    EVENTS_STRING ::= EVENT_STRING
    EVENTS_STRING_REST
    EVENTS_STRING_REST ::= "" | "," EVENT_STRING
    EVENTS_STRING_REST
    EVENT_STRING ::= FUNCTION_CALL_STYLE
    FUNCTION_CALL_STYLE ::= IDENTIFIER | "("
FUNCTION_CALL_STYLE_ARGUMENTS ")"
    FUNCTION_CALL_STYLE_ARGUMENTS ::= "" |
FUNCTION_CALL_STYLE_ARGUMENT |
FUNCTION_CALL_STYLE_ARGUMENT
FUNCTION_CALL_STYLE_ARGUMENTS_EXT
    FUNCTION_CALL_STYLE_ARGUMENTS_EXT ::= ","
FUNCTION_CALL_STYLE_ARGUMENT
    FUNCTION_CALL_STYLE_ARGUMENT ::= STRING |
    NUMBER
    KEYWORDS ::= define for do on
    COMMENT ::= "#".STRING."\n"
```

By way of illustration, code based on the ASK specification may be implemented as follows:

```
define delay_time 5000
    # Set delay_time to 5000
    for "script[src*='facebook.com']" do load on ready
    # load script tag which src attribute contains 'facebook.com' when ready
    for "img.delay" do load on delay($delay_time)
    # load img with "delay" class in $delay_time millisecond after DOM ready
    for "h2, h3" do log("focus"), pass on viewable, mouseenter
    # for h2 and h3 tags, log with tag "focus" to server and pass on to the next rule,
    # when they are viewable or mouseenter fired; this is a feature for Tag Management
    for "div.content"
        do append("<img src='question.jpg'>") on viewable
        do redirect("about.html") on click("button.about")
    # append "<img src='question.jpg'>" tag to "div.content" tag when it is viewable and
    # redirect the page to about.html when "button.about" is clicked
```

By way of illustration, data structures corresponding to the ASK specification may be implemented or defined as follows. The data structure may be an internal representation of AfterShocK states. It may written in JSON or another format.

```
RULE_CHAIN = [RULE]
RULE = {
    id: Number,
    for: [SELECTOR],
    act: RULE_ACTION
}
RULE_ACTION = {
    do: [ACTION],
    on: [EVENT],
}
ACTION, EVENT = {
    name: "Action or Event name",
    args: [VALUE]
}
```

```
        VALUE = {
            val: JSON
        }
```

The following illustrative definitions may be applied to the above data structures:

ACTION may be one of:
  load: load selected element.
  pass: indicate this is not a final rule for selected element. When it is finish processing in current rule, it may pass on to the next rule in the rule chain.

EVENT may be one of:
  ready: fire after DOM is ready, closely related to document ready event in browser; ready event is equal to delay(0)
  delay(ms:Integer): fire after *ms* millisecond of ready event
  click(selector:String): fire when capture click event from element selected by *selector*
  viewable(selector:String): fire when capture DOM element is in viewport event; If selector is omitted, then use target element instead The following is an illustrative glossary of mentioned terms:
  Target Element: DOM element on which actions may be apply
  Final Rule: a Final Rule is the last rule applied to Selected Element
  Selected Element: element matched by selector
  Selector: a subset of CSS selectors
  Element: HTML element
  Rule Chain: a list of rules, order by rule's ID
  Rule ID: an unsigned integer number, higher number means higher priority
  Rule: action apply to selected element on event In some aspects, the ASK server or Transformer maintains session information for the system. For example, the Transformer may keep track of the client session and the third party session that are created. Each third party service may deliver cookies to the client. The Transformer may communicate these cookies to the service whenever a user requests a page. The Transformer may maintain component information for each page. When a page is processed by the TPU, the TPU may send information or instructions on components that should be injected into the page, to the AfterShock server. Based on the information/instructions, the server may inject the correct components or resources, and may communicate with any associated third party services. By way of illustration, information maintained by the Transformer may be represented in the following:

```
{
    "referer": <URL-FOR-PAGE>
    "session-id": <Id of the clients session maintained by aftershock,
could be the same as the yottaa session>
    "components": [{
        "type": {img, script}
        "url": <URL FOR THE SCRIPT>
        "code": <The block of code that specifies the component>
    }, ...]
}
```

In certain embodiments, the ASK client or Executor may perform asynchronous injection of a component, which may include a third party component. The Executor may maintain the location of these components. By way of illustration, one embodiment of a configuration of the AfterShock client is as follows, and describes how to setup various types of processing for various resources:

```
        var config = {
            //The may load all resources after
            defaultDelay: 5000,
            log: true,
            resources: [
            //      {
            //          url: "<The URL of the object to
delay>", //Matching of the URL is done using a contains and not a ==
            //          delayType: "{scroll, timer,
none}",
            //          delayTime: int //The number
of milliseconds after the onload to load this resource.
            //          delayPosition: int //When the
scroll bar reaches this position it may be loaded.
            //      },
            //          EXAMPLES
            //      {
            //          "url":
"http://platform.twitter.com/widgets.js",
            //          "delayType": "defer", //This may
delay loading of the object until the time specified by "delayTime"
            //          "delayTime": 1000
            //      },
            //      {
            //          "url":
"http://connect.facebook.net/en_US/all.js#xfbml=1",
            //          "delayType": "lazy", //This may
delay the loading of the object until the scroll position
            //          Will allow the users to track
a different object then the supplied one. Helpful for loading JS when
            //          a UI component is visible.
            //          "delayPosition": "<id or if
jquery is used on website a selector string>"
            //      },
            //      {
            //          "url":
"http://www.facebook.com/plugins/likebox.php",
            //          "delayType": "none" // skip the
delay loading. Default - iframes
            //      }
            // {
            // "url":
"http://www.facebook.com/plugins/likebox.php",
            // "delayType": "event"
            //     may use a similar string as backbone js.
<event> <selector>.
            //     Example: "delayEvent": "click #mybutton"
            // "delayEvent":
            // }
            ]}
```

Changes to the configuration may be applied by making a call, e.g., yo_configureAfterShock({ }).

Figure 2D:
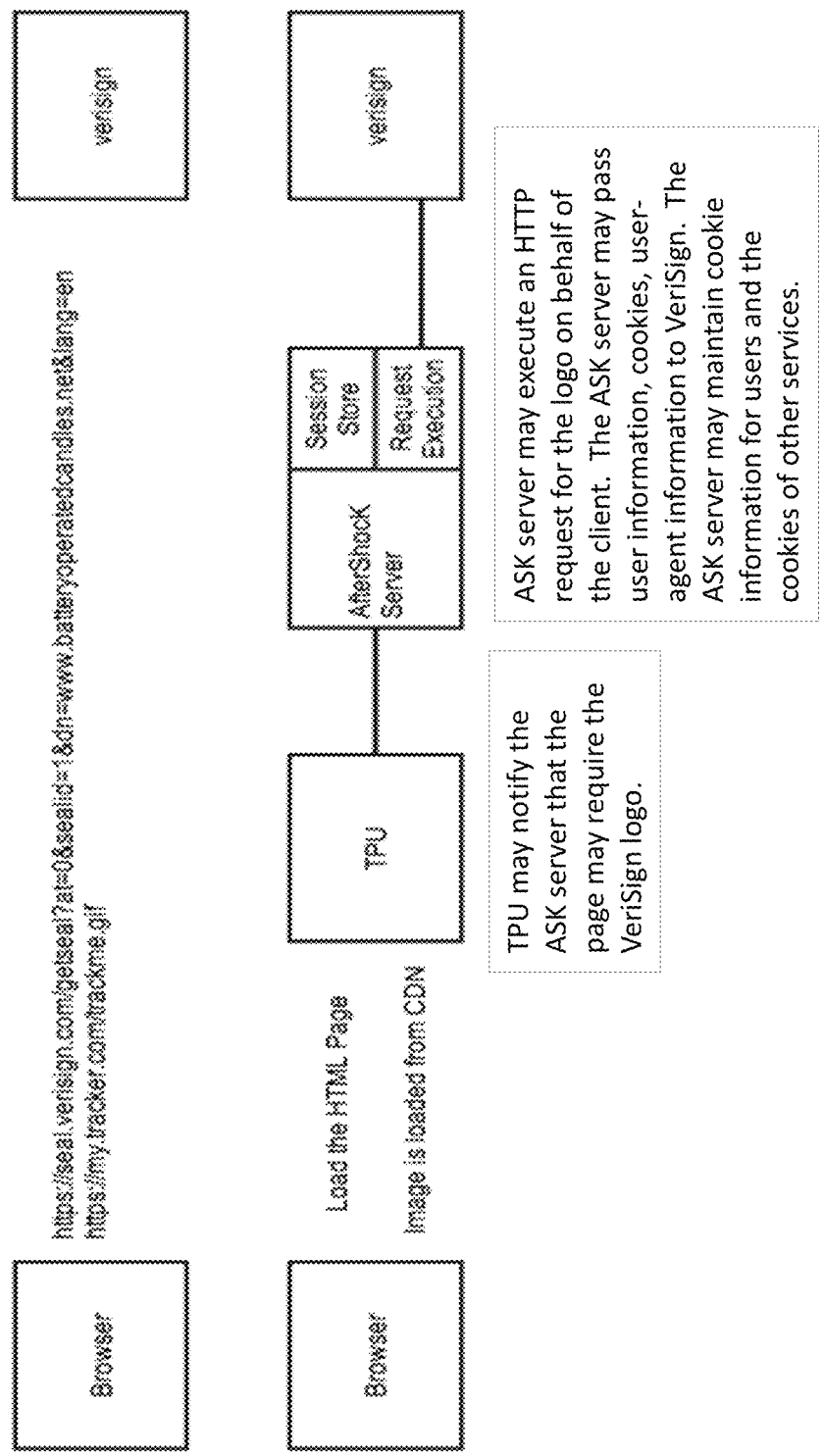
FIG. 2D comprises flow diagrams of embodiments of methods for handling a widget in a browser with and without a web performance optimization (WPO) system.

Web pages may include one or more widgets, such as pixel tags, beacons, social media plugins, images, analytics trackers or agents, media files, and trust shields or badges. Examples of such widgets include: a VeriSign logo, Google analytics agents, Hubspot plugins, and Marketo agents. When WPO detects a widget from a web page, the WPO may direct a request for JavaScript and/or images associated with the widget, to the WPO or TPU's optimizer for handling. Referring to FIG. 2D, a manner by which a widget may be handled by a browser in the absence of the WPO system, as well as via the WPO system, is depicted.

In some embodiments, the WPO may incorporate code into the modified web page to handle the various types of widgets or plug-ins, including third party widgets (e.g., from Facebook, Twitter and Pinterest). Categories of third party widgets include at least the following: (i) Widgets for Facebook, Twitter, Pinterest, Google+, Add this, etc.; (ii) Badges, logos or trust shields, for example, from VeriSign; (iii) Ads, for example, resulting from Google ad words; and (iv) Beacons or agents, for example, from Google Analytics, Marketo, etc. In some embodiments, the WPO may handle ads in a way that is simpler than the handling of widgets, e.g., allow ads to be delay loaded.

The WPO may allow for customization of a configuration of the code, e.g., by a user via the UI. For example, the WPO may allow a user to select or identify specific widgets for targeted processing or handling. The WPO may allow the user to specify when the widget should be injected or loaded onto the page (e.g., disable, X milliseconds after an onLoad event). The WPO may allow a user to change or replace existing widget injection instructions, e.g., change <script src=" "> and inline <iframe> into asynchronous injected widgets. The WPO may allow a user to specify a location within the page into which an <iframe> tag may be injected.

In certain embodiments, the WPO may control the injection of widgets via a JavaScript (JS). Javascript-based injection of a widget may be standardized or implemented in the following manner:

```
(function(d, s, id) {
    var js, fjs = d.getElementsByTagName(s)[0];
    if (d.getElementById(id))
        return;
    js = d.createElement(s);
    js.id = id;
    js.src =
"//connect.facebook.net/en_US/all.js#xfbml=1";
    fjs.parentNode.appendChild(js);
}(document, 'script', 'facebook-jssdk'));
```

The WPO may check or verify if such a script is already injected and if not, add, move, replace or otherwise modify the script into the head node or section. The added/modified script can then handle the injection and/or display of the widget.

In some embodiments, widgets may be injected via an iframe, for example:

```
$("#here").append('<ifr'+'ame
src="//www.facebook.com/plugins/likebox.php?href=http%3A%2F%2Fwww.
facebook.com%2Fplatform&amp;width=292&amp;height=590&amp;show_face
s=true&amp;colorscheme=light&amp;stream=true&amp;border_color&amp;
header=true&amp;appId=20152740944" scrolling="no" frameborder="0"
style="border:none; overflow:hidden; width:292px; height:590px;"
allowTransparency="true"></ifr'+'ame>');
```

The WPO or a user may identify (e.g., locate and indicate) the position of the iframe, for example, via the UI. The WPO may include a library to listen for changes to the DOM and implement the client-side functionality. The library may be Javascript-based, and can be used to manage the scripts and iframes discussed above. In some embodiments, widgets may be loaded in external JS files, and loaded within a sandbox. These widgets may be ignored, or handled differently or similarly to that described above. For example, the widget injection code may be modified to be inline, or the code may be injected into that JS file to affect widget handling within that JS file.

In some web pages, deferring scripts may be incorporated and used to defer or delay an action, for example. Such scripts may be suboptimal and may delay page loading and/or consume system resources. An illustrative embodiment is shown below:

```
<!-- Begin: 4q.iperceptions.com --><script
src="http://4qinvite.4q.iperceptions.com/1.aspx?sdfc=4b17eba0-8764-
3a2c35d2-fbbc-45c0-ae78-5f89f694567e&IID=1&loc=4Q-
WEB2" type="text/javascript" defer="defer" ></script><!-- End:
4q.iperceptions.com -->
```

The WPO may detect and may replace such scripts with the WPO's code injection method to efficiently control any deferral/delay using ASK, for example:

```
<script>
    (function(d, s, id) {
        var js, fjs = d.getElementsByTagName(s)[0];
        if (d.getElementById(id))
            return;
        js = d.createElement(s);
        js.id = id;
        js.src =
"http://4qinvite.4q.iperceptions.com/1.aspx?sdfc=4b17eba0-8764-
3a2c35d2-fbbc-45c0-ae78-5f89f694567e&IID=1&loc=
4Q-WEB2";
        fjs.parentNode.appendChild(js);
    }(document, 'script', 'facebook-jssdk'));
</script>
```

In addition, WPO may detect and may replace blocking scripts using the ASK code injection method. For example, the following blocking script:

```
<script type="text/javascript"
src="http://connect.facebook.net/en_US/all.js#xfbml=1"></script>
``` may be replaced by or modified to:

```
<script type="text/javascript"
src="dataUri:text/javascript;yo_loader('http://connect.facebook.net/en
_US/all.js#xfbml=1')"></script>
```

Alternatively, and in some embodiments, a blocking script may be replaced with similar asynchronous code as discussed above to delay the loading of a resource.

With regards to handling of images, the WPO may handle these with HTML inclusion of image tags. By way of example, the following:

<img.src="//cdn.optimizely.com/js/179843588.js> may be changed into, or replace with the following example code snippet:

```
<img
src="data:image/gif;base64,R0lGODlhAQABAAAAACH5BAEKAAEALAAAAAABAAEAAAI
CTAEAOw=="
    onload="yo_imageLoader(event)"
    onerror="yo_imageLoader(event)"
yo_src='http://seal.stellaservice.com/seals/stellaservice_excellent.pn
g?c=3010'
    yo_delayType='scroll'>
```

Figure 2E:
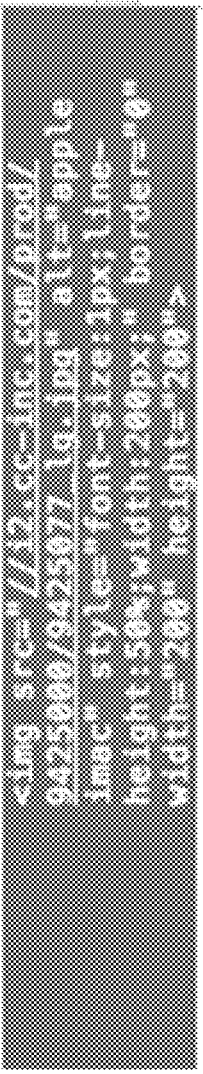
FIG. 2E includes one embodiment of a web page segment including a highlighted portion referencing an image or a resource.

The WPO may use injected code to delay the loading of specific images. Using delay loading may be useful, for example, on blogs and product listing pages, web pages that include many images. To handle images, the WPO may have to perform image selection. This may involve finding and identifying the right images (e.g., to delay load), selecting multiple images, and controlling an appropriate number of images to select. The WPO may in some cases, use URL matching techniques to select images. The WPO may perform image selection using a standard, custom or proprietary query language. The WPO may perform selection of images based on one or more criteria, including DOM position, e.g., identifying a child of a certain element, since in some cases, an image may not have a style or other selectable attributes. For example, and referring to FIG. 2E, an image identified in the highlighted portion may have to be selected from within a web page.

In some embodiments, all elements located after a certain position in a web page may be selected for code-based processing. For example, in a product listing page, it may be desirable to delay the loading of images residing in a secondary, or less important portion of a web page.

In some embodiments, the injected code may control the transitioning characteristics of an image being displayed or appearing on a web page. For example, the code may perform fade-in or fade-out of an image. The image may fade-in or gradually transition to visible state, e.g., when a user scrolls into a portion of the page at which the image is located. This can make the appearance/disappearance of an image less jarring. The code can, alternatively, direct an image to snap on or off screen without a gradual transition.

The WPO may identify and handle existing scripts or script tags in a requested web page. Script tags can block the loading of an application and can cause long delays in page load. The WPO may handle scripts or script tags by code injection into the delivered, modified web page. For such tags, the WPO may process these using ASK to provide the corresponding code for injection. A script loader of the ASK client (e.g., yo_scriptLoader) may perform the actual loading of the script based a configuration. By way of illustration, the following script tag:
    <script    src="//cdn.optimizely.com/js/179843588.js"></script>
may be changed into, or replaced with the following code snippet:

```
<script src="data:text/javascript;plain,/*yo_delay*/"
    onload="yo_scriptLoader(event)"
    onerror="yo_scriptLoader(event)"
    yo_src='//cdn.optimizely.com/js/179843588.js'
    yo_delayType='timer'
    yo_delayValue='1550'></script>
```

In some embodiments, the WPO may detect the insertion of a script tag into the DOM using the AfterShocK client library. The WPO may use the library to manage or perform code/JS injection into the modified page, for example:

```
(function(d, s, id) {
    var js, fjs = d.getElementsByTagName(s)[0];
    if (d.getElementById(id)) return;
    js = d.createElement(s);
    js.id = id;
    js.src = "//cdn.optimizely.com/js/179843588.js";
    fjs.parentNode.appendChild(js);
}(document, 'script', 'facebook-jssdk'));
```

Configuration of these components may be handled by the following illustrative statements:

```
yo_configureAfterShock({ defaultDelay: 5000, resources:
[{url:"//cdn.optimizely.com/js/179843588.js", delayType: "timer",
delayTime: "5000"}] });
```

The WPO may identify and handle existing iframe tags in a requested web page. Iframe tags may block the loading of an application and can cause long delays in page load. The WPO may handle iframe tags by code injection into the delivered, modified web page. For such tags, the WPO may process these using ASK to provide the corresponding code for injection. An iframe loader of the ASK client (e.g., yo_iframeLoader) may perform the actual loading of the iframe based a configuration. The WPO may handle at least two types of iframe injection. By way of illustration, the following iframe tag:

```
<iframe
src="http://seal.stellaservice.com/seals/stellaservice_excellent.png?c
=3010"></iframe>
```
    may be changed into, or replaced with the following code snippet:
```
    <iframe src="data:text/html;plain,<html><body></body></html>"
        onload="yo_iframeLoader(event)"
        onerror="yo_iframeLoader(event)"
yo_src='http://seal.stellaservice.com/seals/stellaservice_excellent.pn
g?c=3010'
        yo_delayType='timer'
        yo_delayValue='1550'></iframe>
```

In some embodiments, the WPO may detect the insertion of a iframe tag into the DOM using the AfterShocK client library. The WPO may use the library to manage or perform code/JS injection into the modified page, for example:

```
$("#here").append('<ifr'+'ame
src="//www.facebook.com/plugins/likebox.php?href=
http%3A%2F%2Fwww.facebook.com%2Fplatform&width=
292&height=590&show_faces=true&
colorscheme=light&stream=true&border_color&
header=true&appId=20152740944" scrolling="no"
frameborder="0" style="border:none;
overflow:hidden;width:292px; height:590px;
" allowTransparency="true"></ifr'+'ame>');
```

Configuration of these components may be handled by the following illustrative statements:

```
yo_configureAfterShock({ defaultDelay: 5000, resources:
[{url:"//www.facebook.com/plugins/likebox.php?", delayType: "timer",
delayTime: "5000"}] });
```

The WPO may generate HTML fragments or injected code to handle waiting images. For iframes and images, the WPO may allow customization of an image displayed while the component has not been loaded. By default, an image (img) may use a transparent 1 pixel gif, for example:

```
data:image/gif;base64,R0lGODlhAQABAAAAACH5BAEKAAEALAA-
AAAABAAEAAAICTAEAOw==and an iframe may use the following,
for example:
data:text/html;plain,<html><body></body></html>
```

The WPO may allow customization of such default content for images. For example, the WPO may allow customization to provide a specific URL, so that user of the WPO system may add a wait cursor via the URL to the modified page, for example. The URL may allow a data URI incorporation of data, inline to a web page. The WPO may allow customization to provide an optimized version for each encountered image in the requested page. For example, if a user is requesting for a web page from a mobile device, the WPO may provide for an extremely compressed image that is no larger than 2 kb in size, for example.

In some embodiments, the WPO may provide the code for injection. The WPO may store or maintain a base code, which may comprise a configuration for configuring or specifying the injected code. The injected code may comprise the ASK client code. In some embodiments, injected code received by a number of clients for a plurality of web pages may be the same or substantially the same. For example, a full or minimized version of the ASK client code may be accessed from a database (e.g., of the intermediary), or from an online repository (e.g., via a URL), for incorporation into a web page fragment.

The WPO may provide a different configuration to each client and/or for each web page, for example, to configure the injected code to behave or operate differently between two clients and/or two web pages. In some embodiments, a configuration specific to a client and/or web page may be used to configure, specify or otherwise generate a piece of code at the intermediary for injection into a particular fragment. In other words, the injected code may be unique to a client (or user) and/or a web page.

By way of illustration, one embodiment of a base code or configuration is depicted below:

```
{
    "_id": "51d32ddf63e31e2d9000074f",
    "name": "AfterShock",
    "enabled": true,
    "last_modified": "2013-07-02T19:45:57Z",
    "token": "6",
    "_type": "Platform::DocumentRule",
    "match": [
        {
            "_id": "51bb222a86305e35e90000f6",
            "name": "URI",
            "type": "0",
            "operator": "CONTAIN",
```

-continued

```
            "condition": "/"
        }
    ],
    "actions": {
        "_id": "51d32ddf63e31e2d90000750",
        "htmlInsert": [
            {
                "_id": "51d32ddf63e31e2d90000751",
                "enabled": true,
                "filters": [ ],
                "content": "<script>//Fill in with the latest
aftershock client code.</script>"
```

-continued

```
        }
    ],
    "transformer": [
        {
            "enabled": true,
            "comment": true,
            "merger": true,
            "item": [
                //See the Tag Handler Section
            ]
        }
    ],
    "asyncJs": [ ],
    "prefetch": [ ],
    "cssCombination": [ ],
    "jsCombination": [ ],
    "cssSprite": [ ],
    "urlRewrite": [ ],
    "dataURI": [ ],
    "badAssetRemoval": [ ],
    "responsiveImage": [ ],
    "clientPrefetch": [ ],
    "cssInline": [ ],
    "jsInline": [ ]
    }
}
```

In some embodiments, the base code may be used to include the ASK client, or to access the ASK client at the client/browser. In certain embodiments, the ASK client uses the base code to configure the injected code to operate in a particular manner at the client/browser. The base code may incorporate, or be used to access code that performs transformation and/or optimization of an aspect of the page, which may improve user experience. The base code or configuration may be based on a default configuration and/or user-customization from default settings. A user, such as an administrator or a representative of a website, may specify or customize a configuration for a web page via a UI and/or API of the intermediary.

In certain embodiments, the injected code may include one or more tag handlers. A handler may be executed or used to remove or replace a particular script tag, process a widget, process a delay, etc. An example embodiment of a handler for removing or replacing <script src="facebook">, is as follows:

```
{
    "type": "1",
    "selector": "script[src~.*all.*]",
    "content": "<script type='text/javascript'>(function( ) {var
po = document.createElement('script'); po.type = 'text/javascript';
po.async = true;po.src =
'//connect.facebook.net/en_US/all.js#xfbml=1';var s =
document.getElementsByTagName('script') [0];
s.parentNode.insertBefore(po, s);})( );</script>"
}
```

An example embodiment of a handler for removing or replacing <scripts src="googleplus">, is as follows:

```
{
    "type": "1",
    "selector": "script[src~.*plusone.*]",
    "content": "<script type='text/javascript'>(function( ) {var
po = document.createElement('script'); po.type = 'text/javascript';
po.async = true;po.src = '//apis.google.com/js/plusone.js';var s =
document.getElementsByTagName('script')[0];
s.parentNode.insertBefore(po, s);})( );</script>"
}
```

An example embodiment of a handler for removing or replacing <script src="twitter">, is as follows:

```
{
    "type": "1",
    "selector": "script[src~.*twitter\\.com\\/widgets.*]",
    "content": "<script type='text/javascript'>(function( ) {var
po = document.createElement('script'); po.type = 'text/javascript';
po.async = true;po.src = '//platform.twitter.com/widgets.js';var s =
document.getElementsByTagName('script')[0];
s.parentNode.insertBefore(po, s);})( );</script>"
}
```

An example embodiment of a handler for removing or replacing <script type="text/javascript"src="//assets.pinterest.com/js/pinit.js"></script>, is as follows:

```
{
    "type": "1",
    "selector": "script[src~.*js\\/pinit.*]",
    "content": "<script type='text/javascript'>(function( )
{var po = document.createElement('script'); po.type =
'text/javascript'; po.async = true;po.src =
'//assets.pinterest.com/js/pinit.js';var s =
document.getElementsByTagName('script')[0];
s.parentNode.insertBefore(po, s);})( );</script>"
}
```

An example embodiment of a handler for managing delaying of a plugin or widget by a configurable delay value, is as follows:

```
{
    "_id": "51d1fb5e63e31e6724000b9c",
    "enabled": true,
    "filters": [ ],
    "content":
"<script>window.yo_configureAfterShock({log:true,defaultDelay:500,
resources:[{url:'monetate.net', delayType:'none'}]});</script>"
}
```

An example embodiment of a handler for managing player.ooyala.com widgets or media, is as follows:

```
{
    "type": "1",
    "selector": "script[src~.*player\.ooyala\.com.*]",
    "content": "<script type='text/javascript'>(function( )
{var po = document.createElement('script'); po.type =
'text/javascript'; po.async = true;po.src =
'//player.ooyala.com/v3/YjlhZDY1YzdkZDhlMGEzN2ZiMWU4OWI3';
var s = document.getElementsByTagName('script')[0];
s.parentNode.insertBefore(po, s);})( );</script>"
}
```

An example embodiment of a handler for managing or tracking core metrics (e.g., relating to web traffic, user experience, etc.), is as follows:

```
{
    "type": "1",
    "selector":
"script[src~.*coremetrics\\.com\\/eluminate\\.js.*]",
    "content": "<script type='text/javascript'>(function( )
{var po = document.createElement('script'); po.type =
'text/javascript'; po.async = true;po.src =
'//libs.coremetrics.com/eluminate.js';var s =
document.getElementsByTagName('script')[0];
s.parentNode.insertBefore(po, s);})( );</script>"
}
```

An example embodiment of a handler for managing or handling Facebook iframes, is as follows:

```
{
    "type": "1",
    "selector": "iframe",
    "content": "<iframe allowtransparency='true'
frameborder='0' data-yo-delayType='lazy'
src='data:text/html;plain,<html></html>' scrolling='no' data-yo-
src='//www.facebook.com/plugins/like.php?href=
http%3A%2F%2Fwww.facebook.com%2Fpages%2FUmbrellas-and-
Beyond%2F133948556657323%3Ffref%3Dts&send=
false&layout=button_count&width=75&show_faces=
false&font=arial&colorscheme=light&action=
like&height=21'style='border:none;overflow:hidden; width:75px;
height:21px;'></iframe>"
}
```

An example embodiment of a reference to an "add this" widget, and an example embodiment of a handler for managing or handling "add this" blocking, is as follows:

```
<script type="text/javascript"
src="http://s7.addthis.com/js/250/addthis_widget.js#pubid=msadegursky"
></script>
{
    "type": "1",
    "selector": "script[src~.*js\\/addthis.*]",
    "content": "<script
type='text/javascript'>(function( ) {var po =
document.createElement('script'); po.type = 'text/javascript';
po.async = true;po.src =
'//s7.addthis.com/js/250/addthis_widget.js#pubid=msadegursky';var s =
document.getElementsByTagName('script')[0];
s.parentNode.insertBefore(po, s);})( );</script>"
}
```

By way of example, one embodiment of code injected to pre-load resources for a webpage from a site called www.mywebsite.com, is as follows:

```
<html xmlns="http://www.w3.org/1999/xhtml" xml:lang="en"
lang="en">
<head>
<script type="text/javascript">
function yo_loader(url){
  try{(new Image( )).src = url;}catch(e){ }
}
</script>
<script
type="text/javascript">yo_loader("http://d272okq92s0nye.cloudfront.net/
50b52f8d4707e6603f000bd8/www.7diamonds.com/v~1f/skin/frontend
/7diamonds/7diamonds/images/free_shipping_and_returns.jpg");
yo_loader("http://d272okq92s0nye.cloudfront.net/50b52f8d4707e6603f
000bd8/www.mywebsite.com/v~1f/media/wysiwyg/
7_diamonds_shop_drop.jpg");
yo_loader("http://d272okq92s0nye.cloudfront.net/50b52f8d4707e6603f
000bd8/www.
mywebsite.com/v~1f/media/mconnect_uploadfiles/f/i/first_video.jpg"
);
yo_loader("http://d272okq92s0nye.cloudfront.net/50b52f8d4707e6603f
000bd8/www.
mywebsite.com/v~1f/media/catalog/category/button_downs_1.jpg");
yo_loader("http://d272okq92s0nye.cloudfront.net/50b52f8d4707e6603f
000bd8/www.
mywebsite.com/v~1f/media/catalog/category/sweaters_3.jpg");
yo_loader("http://d272okq92s0nye.cloudfront.net/50b52f8d4707e6603f
000bd8/www.
mywebsite.com/v~1f/media/catalog/category/kints_polos.jpg");
yo_loader("http://d272okq92s0nye.cloudfront.net/50b52f8d4707e6603f
000bd8/www.
mywebsite.com/v~1f/media/catalog/category/newarrials.jpg");
</script>
....
```

The above code may be injected into the first HTML fragment sent to the browser. The code may be injected at the beginning of the first HTML fragment.

By way of example, one embodiment of code injected to handle cookies for a site called www.mywebsite.com, is as follows:

```
<!--INSTANTON COOKIES START-->
<script type="text/javascript">
document.cookie="frontend=hrv4ncnv6e7upn25c7eqq37ea6; Expires=Tue,
23-Jul-13 16:46:05 GMT;Path=/;Domain=www.mywebsite.com"</script>
<!-- INSTANTON COOKIES END-->
```

The above code may be injected into the second HTML fragment sent to the browser. The code may be injected at the beginning of the second HTML fragment.

Figure 2F:
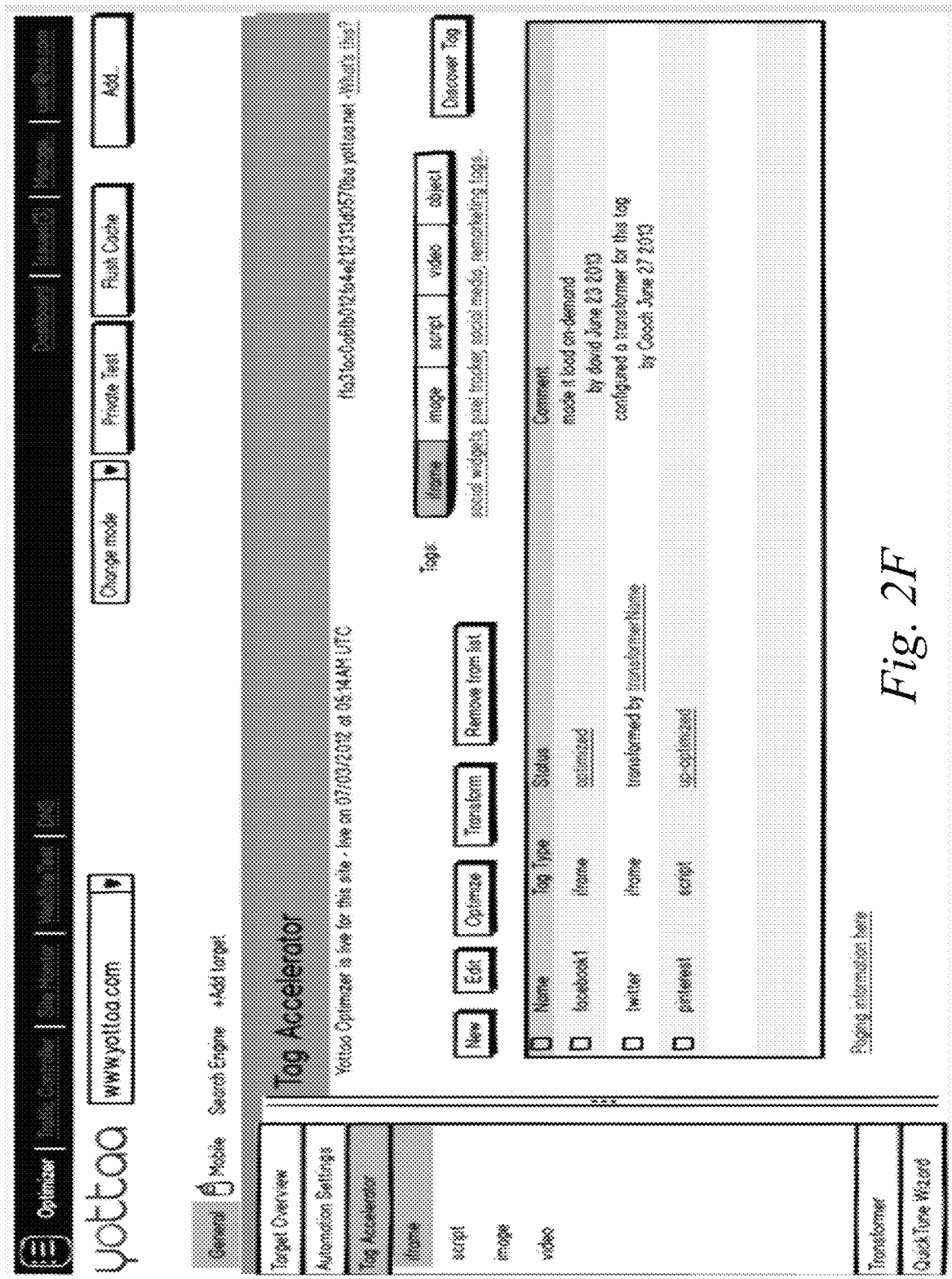
FIGS. 2F-2H comprise embodiments of a user interface for configuring tag-based and other types of modifications to a requested web page.
Figure 2G:
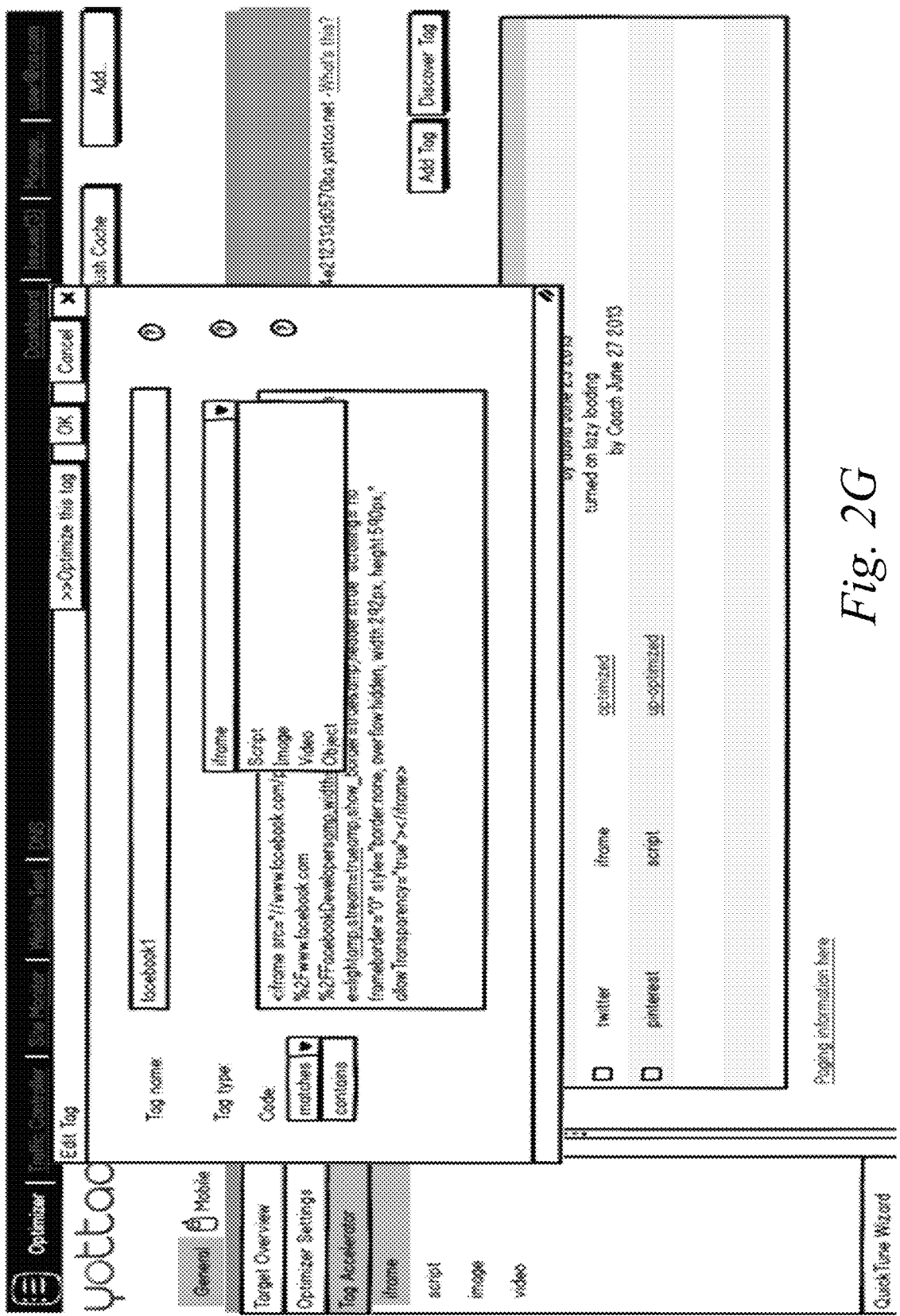
Figure 2H:
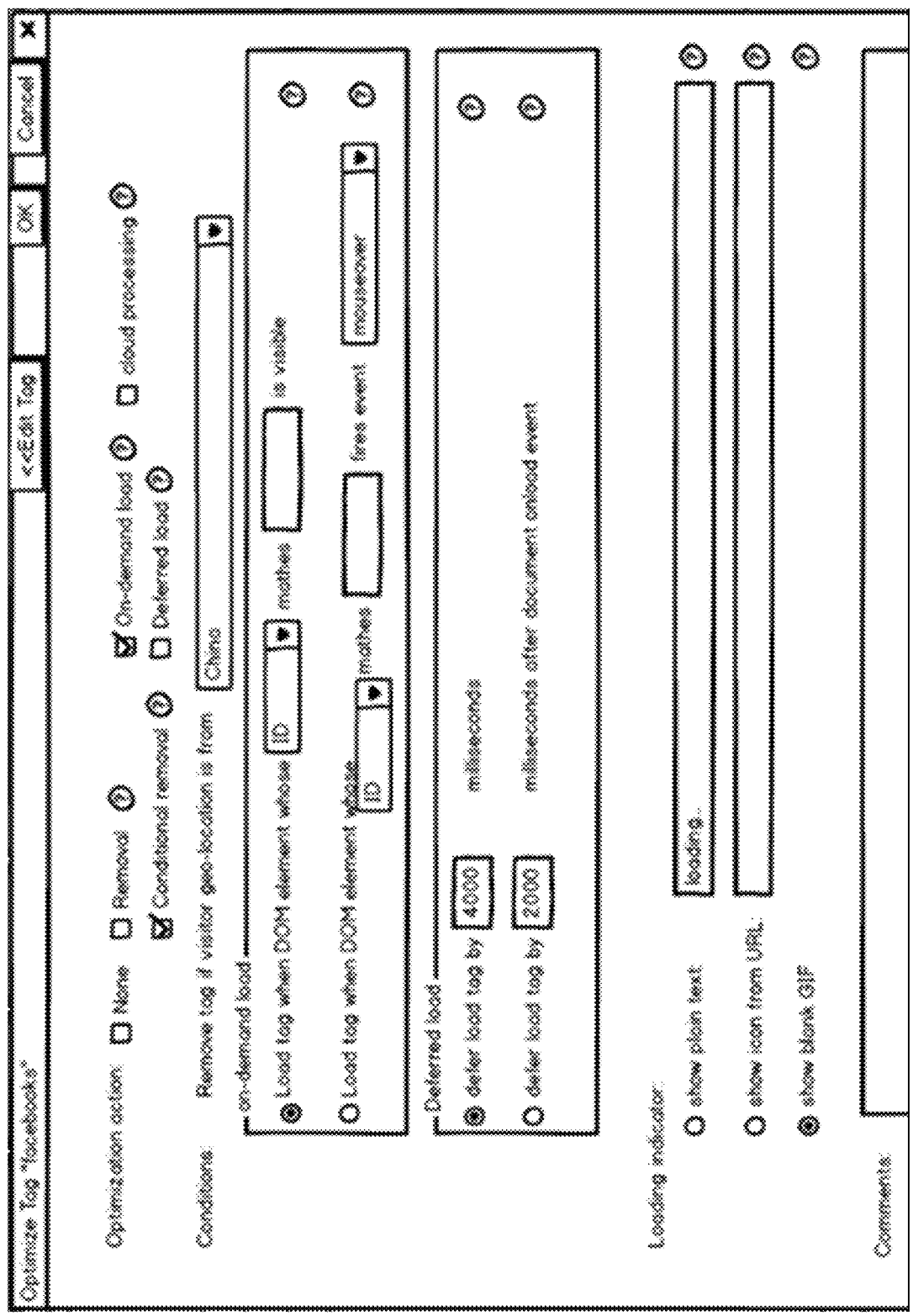

FIGS. 2F, 2G and 2H depict embodiments of a user interface (UI) to configure the intermediary for dynamically modifying a web page from a server for presentation at a client. The user interface may comprise an application or a web-based interface, which may be accessible via the intermediary either remotely, or locally at a component of the intermediary. The user interface may allow a user to customize a configuration for a web page or web site. The configuration may be used to configure code already injected into HTML fragments transmitted to the client, or to configure code for injection into the fragments prior to transmission.

In some embodiments, the UI may provide access to an option for WPO to discover any tags within a requested web page. WPO may automatically recognize or identify different types of tags (e.g., iframe, image, script, video, object) via known signatures (e.g., URL patterns, DOM position). The user may access a list of configured actions on identified tags, with a status and an identification of tag-type for each tag, for example as shown in FIG. 2F. By way of illustration, injected code may be configured to make an iframe tag load on-demand. Certain tags may be left un-optimized, e.g., without any configured action. In some embodiments, a user may identify a tag to configure an action via injected code. The user may specify, via the UI, to identify a tag through a match or partial match with a string or URL, for example, as shown in FIG. 2G.

The user may direct the WPO to optimize the tag, e.g., based on the tag type and/or a priori knowledge about the tag. The user may manually configure one or more actions. By way of example, and as shown in FIG. 2H, a user may select available options for performing an optimization action, e.g., removal of tag, on-demand loading of the tag, cloud processing of the tag, conditional removal of the tag, or deferred loading of the tag. For on-demand loading, a tag may be configured to be loaded if an identified DOM element that matches a certain string is visible and/or is accompanied with an event, e.g., a user event such as a mouse-over, mouse movement, or a click. With regards to deferred loading, the inject code can be configured to defer loading by a customizable delay, which may be determined from the time of the web page request, or a certain time period after a document onload event.

Figure 2I:
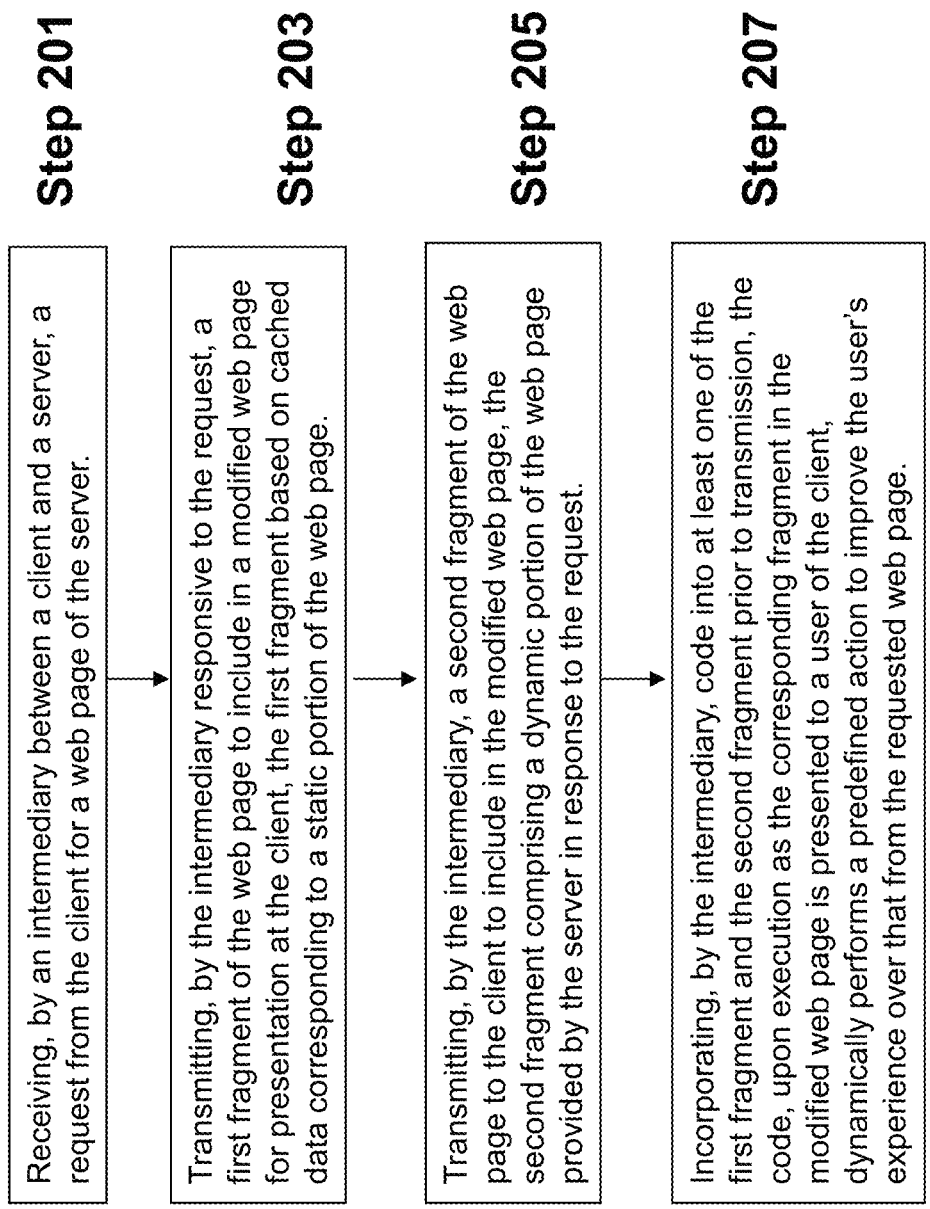
FIG. 2I is a flow diagram of an embodiment of a method for dynamically modifying a requested web page from a server for presentation at a client.

Referring now to FIG. 2I, one embodiment of a method for dynamically modifying a requested web page from a server for presentation at a client is depicted. The method may include receiving, by an intermediary between a client and a server, a request from the client for a web page of the server (201). The intermediary may transmit, responsive to the request, a first fragment of the web page to include in a modified web page for presentation at the client (203). The first fragment may be based on cached data corresponding to a static portion of the web page. The intermediary may transmit a second fragment of the web page to the client to include in the modified web page (205). The second fragment may include a dynamic portion of the web page provided by the server in response to the request. The intermediary may incorporate code into at least one of the first fragment and the second fragment prior to transmission (207). The code may, upon execution as the corresponding fragment in the modified web page is presented to a user of the client, dynamically perform a predefined action to improve the user's experience over that from the requested web page.

Referring now to (201), and in some embodiments, an intermediary between a client and a server receives a request from the client for a web page of the server. A browser of the client may generate the request based on a user action, such as a click on a link or an advertisement. The intermediary may intercept the request from the client. The intermediary may receive or intercept the request, comprising a HTTP or HTTPS request, from the client. In some embodiments, the client may be configured to transmit the request to the server via the intermediary. The intermediary may receive or intercept the request as a cloud service. The intermediary may process the request as a service or feature of an appliance, router, proxy device or any other network device or system. A TMS of the intermediary may receive and route the request to a TPS, embodiments of which were described above in connection with at least FIGS. 2A and 2B. The TPS may reside in the intermediary or comprise a network device or cloud service. The TPS may receive and process the request, for example, prior to requesting the server for the web page.

Referring now to (203), and in some embodiments, the intermediary may transmit, responsive to the request, a first fragment of the web page to include in a modified web page for presentation at the client. The intermediary may transmit the first fragment of the web page to for processing, assembly, loading, rendering, execution and/or presentation at the client, e.g., on a browser of the client. The first fragment may be based on cached data corresponding to a static portion of the web page. The TPS may access a cache of web page data corresponding to the requested web page. The cache may store or maintain web page data received from one or more servers, including the requested server and/or a mirror site of the requested server. The cache may store one or more components of a web page that may be static, e.g., a header section of the page.

The static portion may comprise elements of the page that do not change between multiple requests, requesting clients, geographical locations of the clients, browsers and/or users, or that do not change over a certain period of time. The static portion may be identified, determined, detected and/or inferred by the TPS over one or more requests for the web page. The static portion may be manually configured or identified by a user or administrator. In some embodiments, the static portion is identified via a comparison between a cached copy of the web page and a later copy provided by the server. The TPS may immediately transmit a first fragment of the page to the client, comprising the static portion of the page, for loading on a browser. Due to the availability of this fragment within a short period of time from the request, a user of the client experiences a more responsive and faster page load in association with the requested web page.

In some embodiments, the intermediary may transmit or convey the request for the web page to the server. The TPS may convey, direct, route or re-transmit the request to the server in parallel with the processing of the request at the intermediary. The TPS may send the request to the server during, before or after processing the request at the intermediary. In some embodiments, the TPS may modify the request, or generate a new request for the web page or for a portion of the web page. Responsive to the request, the server may generate a response comprising a web page, including a dynamic portion of the web page. The dynamic portion may, for example, be specific to the user, the client, the browser, geographical location and/or the time of the request. The server may send the web page and/or a cookie in one or more responses to the request. The server may send the one or more responses to the client or the intermediary, e.g., as each response becomes ready to send.

The intermediary may receive the requested web page from the server responsive to the request, the web page comprising at least the dynamic portion. The intermediary may receive a cookie from the server responsive to the request. The intermediary may receive or intercept the response on behalf of the client (e.g., via Cname or DNS redirection). The intermediary may identify and/or extract the dynamic portion from the response. The intermediary may identify and/or extract a difference or delta from the web page relative to the portion already returned to the client. In some embodiments, the TPS generates or forms a second fragment of the web page based on the difference/delta or the dynamic portion of the web page. The intermediary may form the second fragment as soon as, or responsive to receiving the response from the server.

Referring now to (205), and in some embodiments, the intermediary may transmit another fragment (e.g., a second fragment) of the web page to the client to include in the modified web page. This fragment may include a dynamic portion of the web page provided by the server in response to the request. The TPS may transmit the second fragment to the client as soon as the second fragment is generated. The intermediary may send or convey the cookie from the server to the client. The intermediary may incorporate code (e.g., Javascript, VBScript, ActionScript, a plug-in implemented in a language such as C, C++, a script referencing a browser plug-in, or a script referencing a native module) in the second fragment to set (e.g., maintain, update and/or identify) the cookie at the client for use in a further communication with the server.

In some embodiments, the intermediary may incorporate code in a different fragment (e.g., a third fragment) to set the cookie at the client for use in a further communication with the server. This fragment may be transmitted prior to, responsive to, concurrent with, during or after the transmission of the second fragment to the client. In some embodiments, the third fragment does not include or convey a dynamic portion and/or a static portion of the web page. The intermediary may transmit the corresponding cookie with the third fragment, or transmit the corresponding cookie in a message separate from the third fragment.

Referring now to (207), and in some embodiments, the intermediary may incorporate code into at least one of the fragments (e.g., the first, second and/or third fragments) prior to transmission to the client. The code may be implemented with an appropriate programming or scripting language, such as Javascript, VBScript, ActionScript, a plug-in implemented in a language such as C, C++, a script referencing a browser plug-in, or a script referencing a native module. The intermediary may incorporate or inject a particular type, set and/or collection of code depending on which fragment to which the code is being injected. The intermediary may incorporate a particular type, set and/or collection of code depending on at least one of: data cached in connection with the requested web page, a feature or characteristic of the web page, the requesting user, a characteristic of the client and/or client browser (e.g., client/browser type, geographical location, language preference, etc.), any injected code already delivered to the client via a prior fragment, and a configuration of the intermediary and/or server pertaining to code injection. The intermediary may inject or incorporate code to replace or modify existing code or features in the requested web page. For example, and in some embodiments, the intermediary may disable, modify and/or replace existing deferring or blocking scripts with Javascript code, as discussed above in connection with at least FIGS. 2A and 2B. The intermediary may incorporate or inject the code inline in a message (e.g., HTTP message), or in a separate script file referenced or attached to the message.

The code may, upon execution while the corresponding fragment in the modified web page is presented to a user of the client, dynamically perform a predefined action to improve the user's experience over that from the requested web page. The code may run, execute or be otherwise activated when the corresponding fragment is loaded or processed at a browser or other application of the client. The browser or client application may execute or run the code by loading the fragment. The browser or client application may execute or run the code as the fragment is loaded. At least a portion of the code may remain active or continue to run after the fragment is loaded. For example, the code may, continuously or for a period of time, poll, monitor or detect an action by the user, in the background. A portion of the code may execute after a configured delay, or be triggered by a page load event, browser event, DOM event and/or user action.

The intermediary may incorporate code in a multipurpose internet mail extensions (MIME) multipart message. The code may be injected into a HTTP message. The intermediary may transmit the one or more fragments in a MIME multipart message (e.g., one or more of the subtypes of a multipart message). The intermediary may transmit the one or more fragments via any type of HTTP message. The intermediary may incorporate code in a MIME multipart message to set the cookie at the client for use in a further communication with the server. The intermediary may transmit the first fragment, the second fragment and/or the third fragment via MIME multipart messages to include in the modified web page. The intermediary may transmit one or more of the fragments for assembly and/or processing at the client.

The intermediary may incorporate code based on a configuration of the intermediary. As discussed, the configured may be based on the client device type, browser type, the user, the geographical location, etc. The intermediary may incorporate code customizable via a user interface and/or an API. A representative of the server or website, or an administrator, may customize the configuration based on knowledge of the web page, e.g., obtained via analysis of past traffic. The code may be configured to dynamically perform a predefined action, e.g., using a default and/or customized configuration provided by the intermediary and/or a user. The code may be injected, added or incorporated to operate at the client, e.g., in the background, without the user of the client realizing that the code is present or running. The code may be injected, added or incorporated to operate at the client, without requiring a change or modification at the server, e.g., to generate the web page. The code may be injected, added or incorporated to execute at the client without affecting how the requested web page is generated and transmitted. The code may be incorporated into the one or more transmitted fragments, to modify or alter a feature or characteristic of the requested web page. The code may be incorporated into the one or more transmitted fragments forming a modified version of the requested web page.

In some embodiments, the intermediary incorporates code that directs or requests the client's browser to perform a certain action. The intermediary may incorporate code that directs the client's browser to request for web page data corresponding to the client's device or browser type. For example, the intermediary and/or the injected code may detect that the client comprises a mobile device, or includes a browser with limited capabilities (e.g., lack of support for Flash). By way of an illustrative embodiment, the code may detect the client's device or browser type, or a capability thereof, via a client-agent attribute. The client-agent attribute may be configured in the client or included in the request. The code may direct the browser to request for web page data, of the identified web page, corresponding to the client's device or browser type. For example, the injected code may request for a portion of the web page data (for the requested web page) appropriate for the device/browser, e.g., that can be rendered on the device/browser.

In certain embodiments, the intermediary may incorporate code that directs the client's browser to request for another web page corresponding to the client's device or browser type. As described earlier, the intermediary and/or injected code may detect that the client comprises a mobile device, a large form-factor screen, or a browser with specific capabilities and/or limitations. Based on the detection, the code may be configured to direct or redirect the browser to request for a different web page, e.g., from the same web server or a different web server. For example and in some embodiments, the code may direct the browser to request a different web page optimized for a mobile device, a large-screen device or a touch-screen device. The code may direct the browser to request a web page optimized for an operating system of the device (e.g., iOS, Android, Windows, etc.) The code may direct the browser to request a web page optimized for a particular browser, e.g., Internet Explorer, Safari, Chrome browser, Firefox, etc. Thus, the injected code can improve or optimize a user's experience by customizing web page content or source based on device/browser attributes.

The intermediary may incorporate code that affects an aspect of any one or more resources for the modified web page. By way of illustration, and not intended to be limiting in any way, a resource may include one or more of: hypertext markup language (HTML) content or object, an image, a cascading style sheet (CSS), a widget, a social media plug-in, an analytics agent, a pixel tag, a beacon, a trust seal or badge, a media file, a script and an advertisement.

The intermediary may incorporate code that adds or modifies a configuration for including advertising in the modified web page. The code may detect if advertising is already provided for in the requested web page. The code may remove advertising, e.g., to improve page load time, or to exclude advertising material that is not relevant to the user. The code may modify an existing configuration, e.g., changing an aspect ratio, size, shape, position, animation (e.g., transition effects in presenting an ad or switching ads) of an ad. The code may control timing or delaying of an ad relative to other elements of the page, or in response to a user event or a page load event. In certain embodiments, the code may include an ad by creating a configuration for the ad, or modifying an existing configuration. In this way, the code may be used to incorporate customized content that may be from a third party. The intermediary and/or the injected code may also facilitate impression matching and/or perform brokering with third parties like ad exchanges, ad networks and ad agencies. Accordingly, the code may improve user experience by (i) providing access to relevant and/or customized content, goods and services via intelligent injection/modification of ads, (ii) removing or limiting irrelevant ads, and/or (iii) affecting the presentation of ads based on device/browser attributes and/or particular events.

The intermediary may incorporate code that directs the client's browser to pre-fetch a resource to store in a local cache. The injected code may direct or request the browser to fetch or access a resource (e.g., image), in anticipation that the resource may be needed shortly. For example, the code may direct or request the browser to request and load a resource in a local cache (e.g., of the browser). This pre-fetch may be performed in advance so that any impact from the access, transfer and/or load times for the resource, which may impair page load duration, is minimized. One or more resources may be identified (e.g., via a customized configuration) for pre-fetching. Suitable resources for pre-fetch may include certain large images and widgets, a related web page, or resources originating from a server/database with a slower response. By performing the pre-fetch in advance or in parallel with other page processing activities, the user's experience may be improved with the enhanced performance in loading the web page.

The intermediary may incorporate code that incorporates a third-party widget or content into the modified web page. The injected code may be configured to include content relevant to a user or the requested web page, without reconfiguring the server or how it generates its web page. Widgets from partners, such as third party analytics, may be added to a web page so that a user's online activity (e.g., specific to that web page or across pages) may be tracked and/or analyzed to improve customization of content and/or advertising relevant to the user. Such customization can be performed in real time or introduced at a later, appropriate time. The code may also introduce popular social media widgets or plug-ins, for example, to encourage user interaction, interest and involvement in the web page. Certain trial widgets, features and/or content may be included on-the-fly via the intermediary and/or injected code. For example, trial or limited rollout of a feature may be targeted to specific users, time periods, geographical areas, etc., via dynamic web page modification using the present systems and methods, without reconfiguring the end server. In some cases, third party provided content or widgets may be more securely introduced at a cloud service or intermediary, instead of being integrated with requested the web page at the server.

The intermediary may incorporate code that controls a location of a resource in the modified web page. The injected code may identify and detect particular resources that are less relevant or which may take longer to load. The injected code may identify and detect particular resources that are more relevant or may be faster to load. The injected code may control the layout of content and other resources by modifying a location of a resource in the web page. For example, the code may control a location of a resource relative to that of another resource. A resource may be re-located to the end of a web page so that it has more time to load, e.g., before the user scrolls to the end of the page. The code may re-position a resource to highlight the resource to a user, consolidate similar resources within a portion of the page, or to improve the layout of the page to the user.

The intermediary may incorporate code that controls a time instant for loading a resource to the modified web page. The injected code may initiate pre-fetching or caching of the resource to control the time instant for loading a resource. The code may delay or time the loading of a resource, e.g., relative to the request for the web page, or relative to a DOM, user or page load event. The code may replace or modify an existing deferring or blocking script. The injected code may comprise an asynchronous loading code. The latter may speed up page loads by allowing asynchronous execution. The latter may prevent a page for being held up trying to load a resource if for example, a third party site goes down or is slow. In some embodiments, the injected code controls a time instant for loading a resource into or from a local cache. For example, the code may direct a browser to load a resource onto a page, but keep the resource in the background (e.g., without making the resource visible or active). In certain embodiments, the injected code may control a time instant for loading a resource relative to a DOM, page load or user event, e.g., a click, a mouse-over, contact with a touchpad, a key entry, eye movement, scrolling action, etc. The injected code may controls a time instant for loading a resource, e.g., an image or widget, when DOM is ready, or when the resource's location is in viewport.

In some embodiments, the intermediary incorporates code that determines a loading sequence for a plurality of resources. As discussed earlier, the injected code can determine a time instance and/or a position for loading a resource. The injected code can determine a time instance and/or a position for loading a resource relative to another resource or to other resources. For example, the code can control a loading sequence for a slideshow function. The intermediary and/or the code may be able to identify or detect a larger image or other resource that should be loaded earlier (e.g., pre-fetched), or delayed (e.g., to avoid a bottleneck in page load). The intermediary and/or the code may incorporate or comprise an algorithm to select and/or order resources for sequential and/or parallel loading.

The intermediary may incorporate code that controls a time instant for making a resource visible or not visible to the user. The injected code may control the time instant(s) and/or duration of a resource's visibility, transparency or alpha-blending with other elements, when loaded on a web page. The injected code may control the time and duration of transitioning effects (e.g., fade-in, fade-out) in making a resource visible or not visible to a user. The injected code may make a resource loaded in the background visible at a certain time or after a certain delay relative to a DOM or user event. The intermediary may incorporate code that triggers loading or visibility of a resource based on an action by the user, e.g., a click, a mouse-over, contact with a touchpad, a key entry, eye movement, scrolling action, etc. The injected code may control a time instant for making a resource visible or not visible relative to the visibility of another resource. The injected code may control a time instant for making a group or collection of resources visible or not visible to the user. In certain embodiments, the intermediary may incorporate code that triggers loading or visibility of a resource based on a web page loading event. The injected code may control a time instant for making a resource, e.g., an image or widget, visible when DOM is ready, or when the resource's location is in viewport.

Different portions or combinations of code may be injected based on existing features, and customizable based on particular requirements. Different portions or combinations of code may be injected on-the-fly to one or more fragments, while a request for a web page is processed. On-the-page processing occurs as the individual fragments are loaded onto a browser. Accordingly, the present systems and method provide a platform for dynamically modifying aspects of a requested web page that improve user experience.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A method for dynamically modifying a requested web page from a web page server for presentation at a client, comprising:

(a) receiving, by an intermediary comprising a network device residing between a client and a web page server, a request from the client for a web page of the web page server;

(b) transmitting, by the intermediary based on a pre-fetch responsive to the request, a first fragment of the web page to include in a modified web page for presentation at the client, the first fragment corresponding to a cached static portion of the web page;

(c) responsive to receiving the requested web page from the web page server, identifying differences between the requested web page and the first fragment;

(d) transmitting, by the intermediary, a second fragment of the web page to the client to include in the modified web page, the second fragment comprising a dynamic portion of the web page including the identified differences between the requested web page and the first fragment; and (e) incorporating, by the intermediary residing between the web page server and the client, code, which is configuration specific, into at least one of the first fragment and the second fragment of the web page prior to transmission to the client, the code, when executed on the client as the corresponding fragment in the modified web page is presented to a user of the client, dynamically configures a target location for a third fragment on the modified web page, and performs a predefined action of triggering transfer of the third fragment of the web page, from the intermediary, to load at the target location configured by the code for the third fragment on the modified web page, wherein the third fragment has yet to be transferred from the intermediary, responsive to a scrolling action that causes the target location on the modified web page to move into a viewport of the client, the predefined action of the code for the transfer and the loading of the third fragment specified via a configuration of the intermediary.

2. The method of claim 1, wherein (e) comprises incorporating code that directs the client's browser to request for web page data corresponding to the client's device or browser type.

3. The method of claim 1, wherein (e) comprises incorporating code comprising at least one of ECMAScript or a language similar or related to ECMAScript, VBScript, ActionScript, script referencing a browser plugin and script referencing a native module.

4. The method of claim 1, wherein (e) comprises incorporating code that directs the client's browser to request for another web page corresponding to the client's device or browser type.

5. The method of claim 1, wherein (e) comprises incorporating code that adds or modifies a configuration for including advertising in the modified web page.

6. The method of claim 1, wherein (e) comprises incorporating code that directs the client's browser to pre-fetch a resource to store in a local cache.

7. The method of claim 1, wherein (e) comprises incorporating code that incorporates a third-party widget or content into the modified web page.

8. The method of claim 1, wherein (e) comprises incorporating code that controls a location of a resource in the modified web page.

9. The method of claim 1, comprising incorporating code that controls a time instant for loading a resource to the modified web page.

10. The method of claim 1, comprising incorporating code that determines a loading sequence for a plurality of resources.

11. The method of claim 1, comprising incorporating code that controls a time instant for making a resource visible to the user.

12. The method of claim 1, comprising incorporating code that triggers loading or visibility of a resource based on a web page loading event.

13. The method of claim 1, comprising incorporating code that triggers loading or visibility of a resource based on a document object model event.

14. The method of claim 1, wherein (e) comprises incorporating code that affects an aspect of a resource for the modified web page, the resource comprising one of: hypertext markup language (HTML) content, an image, a cascading style sheet (CSS), a widget, a social media plug-in, an analytics agent, a pixel tag, a beacon, a trust seal or badge, and an advertisement.

15. The method of claim 1, further comprising transmitting, by the intermediary, the request for the web page to the web page server.

16. The method of claim 1, further comprising receiving, by the intermediary, the requested web page from the web page server responsive to the request, the web page comprising at least the dynamic portion.

17. The method of claim 1, further comprising receiving, by the intermediary, a cookie from the web page server responsive to the request.

18. The method of claim 1, further comprising sending, by the intermediary to the client, a cookie from the web page server.

19. The method of claim 18, wherein (e) comprises incorporating code in the second fragment to set the cookie at the client for use in a further communication with the web page server.

20. The method of claim 18, wherein (e) comprises incorporating code in a third fragment to set the cookie at the client for use in a further communication with the web page server.

21. The method of claim 18, wherein (e) comprises incorporating code in a multipurpose internet mail extensions (MIME) multipart message to set the cookie at the client for use in a further communication with the web page server.

22. The method of claim 1, comprising transmitting the first fragment and the second fragment via MIME multipart messages to include in the modified web page.

23. The method of claim 1, wherein (e) comprises incorporating code based on the configuration of the intermediary.

24. The method of claim 1, wherein (e) comprises incorporating code customizable via a user interface.

25. A system for dynamically modifying a requested web page from a web page server for presentation at a client, the system comprising:

an intermediary comprising a network device residing between a client and a web page server, the intermediary comprising a processor and receiving a request from the client for a web page of the web page server, transmitting, based on a pre-fetch responsive to the request, a first fragment of the web page to include in a modified web page for presentation at the client, the first fragment corresponding to a cached static portion of the web page, responsive to receiving requested web page from the web page server, identifying differences between the requested web page and the first fragment, and transmitting a second fragment of the web page to the client to include in the modified web page, the second fragment comprising a dynamic portion of the web page including the identified differences between the requested web page and the first fragment; and code, which is configuration specific, incorporated, by the intermediary residing between the web page server and the client, into at least one of the first fragment and the second fragment of the web page prior to transmission to the client, the code, when executed on the client as the corresponding fragment in the modified web page, wherein the third fragment has yet to be transferred from the intermediary, is presented to a user of the client, dynamically configures a target location for a third fragment on the modified web page, and performs a predefined action of triggering transfer of the third fragment of the web page, from the intermediary, to load at the target location configured by the code for the third fragment on the modified web page, responsive to a scrolling action that causes the target location on the modified web page, to move into a viewport of the client, the predefined action of the code for the transfer and the loading of the third fragment specified via a configuration of the intermediary.

26. The system of claim 25, wherein the code directs the client's browser to request for web page data corresponding to the client's device or browser type.

27. The system of claim 25, wherein the code comprises at least one of ECMAScript or a language similar or related to ECMAScript, VBScript, ActionScript, script referencing a browser plugin and script referencing a native module.

28. The system of claim 25, wherein the code directs the client's browser to request for another web page corresponding to the client's device or browser type.

29. The system of claim 25, wherein the code adds or modifies a configuration for including advertising in the modified web page.

30. The system of claim 25, wherein the code directs the client's browser to pre-fetch a resource to store in a local cache.

* * * * *